United States Patent
Moon et al.

(10) Patent No.: US 10,516,677 B2
(45) Date of Patent: Dec. 24, 2019

(54) METHOD AND APPARATUS FOR PROVIDING INTEGRITY CHECK DATA

(71) Applicant: SAMSUNG ELECTRONICS CO., LTD., Suwon-si, Gyeonggi-do (KR)

(72) Inventors: Han-gil Moon, Seoul (KR); Hyun-wook Kim, Suwon-si (KR); Nam-suk Lee, Suwon-si (KR); Jae-eun Kang, Suwon-si (KR); Yu-mi Sohn, Seongnam-si (KR)

(73) Assignee: SAMSUNG ELECTRONICS CO., LTD., Suwon-si, Gyeonggi-do (KR)

( * ) Notice: Subject to any disclaimer, the term of this patent is extended or adjusted under 35 U.S.C. 154(b) by 179 days.

(21) Appl. No.: 15/531,590

(22) PCT Filed: Nov. 26, 2015

(86) PCT No.: PCT/KR2015/012785
§ 371 (c)(1),
(2) Date: May 30, 2017

(87) PCT Pub. No.: WO2016/093516
PCT Pub. Date: Jun. 16, 2016

(65) Prior Publication Data
US 2017/0331837 A1    Nov. 16, 2017

(30) Foreign Application Priority Data
Dec. 8, 2014 (KR) .................. 10-2014-0175378

(51) Int. Cl.
*H04L 29/06* (2006.01)
*H04W 12/10* (2009.01)
(Continued)

(52) U.S. Cl.
CPC .............. *H04L 63/123* (2013.01); *H04L 1/00* (2013.01); *H04L 9/3236* (2013.01); *H04L 29/08* (2013.01);
(Continued)

(58) Field of Classification Search
CPC ...... H04L 63/12; H04L 63/123; H04W 12/10; H04W 12/1006
See application file for complete search history.

(56) References Cited

U.S. PATENT DOCUMENTS 5,812,534 A    9/1998  Davis et al.
7,746,906 B2   6/2010  Jinzaki et al.
(Continued)

FOREIGN PATENT DOCUMENTS

CN    101174995    5/2008
CN    101847409    9/2010
(Continued)

OTHER PUBLICATIONS

International Search Report for PCT/KR2015/012785, dated Feb. 25, 2016, 4 pages.
(Continued)

*Primary Examiner* — Daniel B Potratz
(74) *Attorney, Agent, or Firm* — Nixon & Vanderhye, P.C.

(57) ABSTRACT

Provided is a method of a device transmitting integrity check data. The method includes establishing a voice communication channel with at least one other device, determining a size of a packet to be transmitted through the established voice communication channel based on a bandwidth of the communication channel, detecting a user's voice from an input signal, selectively inserting integrity check data for checking the integrity of data to be transmitted into the
(Continued)

packet based on a result of the detection, and transmitting the packet to the at least one other device.

14 Claims, 11 Drawing Sheets

(51) Int. Cl.
  *H04L 9/32*  (2006.01)
  *H04L 1/00*  (2006.01)
  *H04L 29/08*  (2006.01)

(52) U.S. Cl.
  CPC ........ *H04L 63/166* (2013.01); *H04L 65/1069* (2013.01); *H04L 65/602* (2013.01); *H04L 65/608* (2013.01); *H04L 65/80* (2013.01); *H04L 67/04* (2013.01); *H04L 67/12* (2013.01); *H04L 69/22* (2013.01); *H04L 69/324* (2013.01); *H04W 12/1006* (2019.01); *H04L 2209/34* (2013.01)

(56) References Cited

U.S. PATENT DOCUMENTS

| | | | |
|---|---|---|---|
| 8,300,824 B1 | 10/2012 | McGrew et al. | |
| 8,649,278 B2 | 2/2014 | Chen et al. | |
| 2005/0083917 A1* | 4/2005 | Okamoto | H04L 29/06 370/352 |
| 2005/0259613 A1* | 11/2005 | Garudadri | H04L 29/06 370/328 |
| 2005/0265349 A1 | 12/2005 | Garg et al. | |
| 2006/0227773 A1* | 10/2006 | Grewal | H04L 63/123 370/389 |
| 2006/0276137 A1* | 12/2006 | Pummill | H04L 63/0853 455/67.11 |
| 2007/0237144 A1 | 10/2007 | Adhikari et al. | |
| 2008/0232589 A1* | 9/2008 | Chamberlain | H04K 1/00 380/275 |
| 2009/0070871 A1* | 3/2009 | Poppe | H04L 63/123 726/22 |
| 2009/0307766 A1 | 12/2009 | Rose et al. | |
| 2011/0088024 A1 | 4/2011 | Tackett et al. | |
| 2011/0222403 A1 | 9/2011 | Suh et al. | |
| 2011/0310893 A1* | 12/2011 | Kasztenny | H04L 1/0061 370/389 |
| 2013/0085751 A1* | 4/2013 | Takahashi | G10L 19/018 704/205 |
| 2013/0166960 A1 | 6/2013 | Das et al. | |
| 2013/0227264 A1 | 8/2013 | Kim et al. | |
| 2013/0322626 A1 | 12/2013 | Yang et al. | |
| 2016/0315762 A1 | 10/2016 | Moon et al. | |

FOREIGN PATENT DOCUMENTS

| | | |
|---|---|---|
| CN | 101895457 | 11/2010 |
| CN | 102301764 | 12/2011 |
| CN | 103024220 | 4/2013 |
| JP | 2000-68970 | 3/2000 |
| JP | 2002-164915 | 6/2002 |
| JP | 2013-76871 | 4/2013 |
| JP | 2013-523003 | 6/2013 |
| KR | 10-2014-0064129 | 5/2014 |
| KR | 10-2015-0069982 | 6/2015 |

OTHER PUBLICATIONS

Extended European Search Report dated Jan. 23, 2018 in counterpart European Patent Application No. 15867568.6.
Baugher, M. et al: "RFC 3711-The Secure Real-time Transport Protocol (SRTP)," Mar. 31, 2004, XP055440590, pp. 1-57.
First Office Action dated May 4, 2018 in counterpart Chinese Patent Application No. 201510896372.1 and English-language translation.
Non-Final Rejection dated Oct. 1, 2019 in counterpart Japanese Patent Application No. 2017-528189 and English-language translation thereof.

* cited by examiner

[Fig. 1]
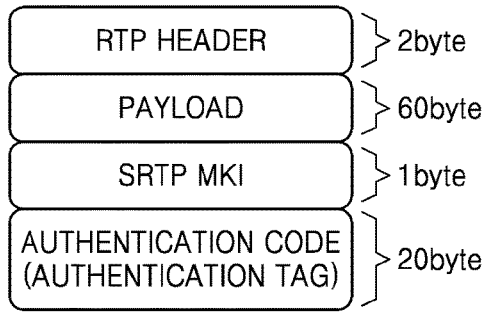
[Fig. 2]
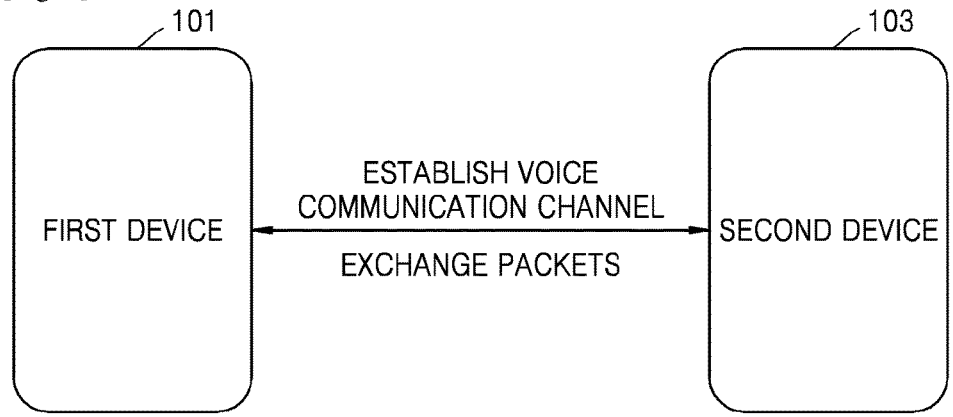
[Fig. 3]
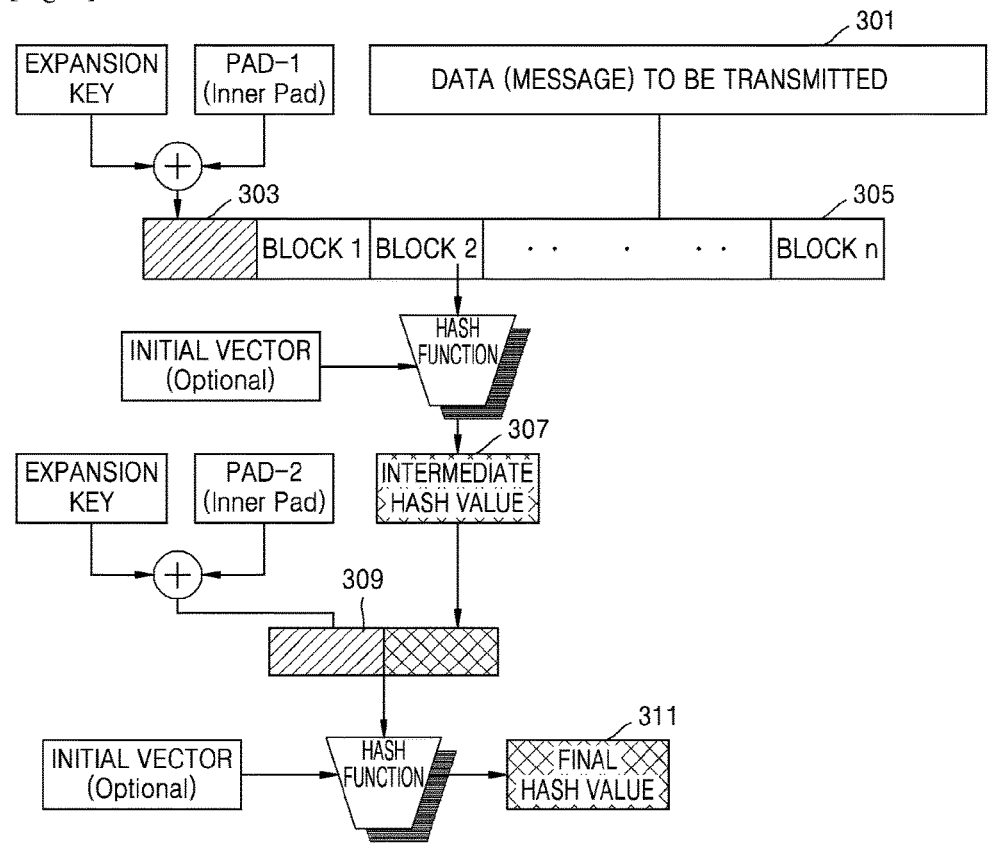

[Fig. 4]
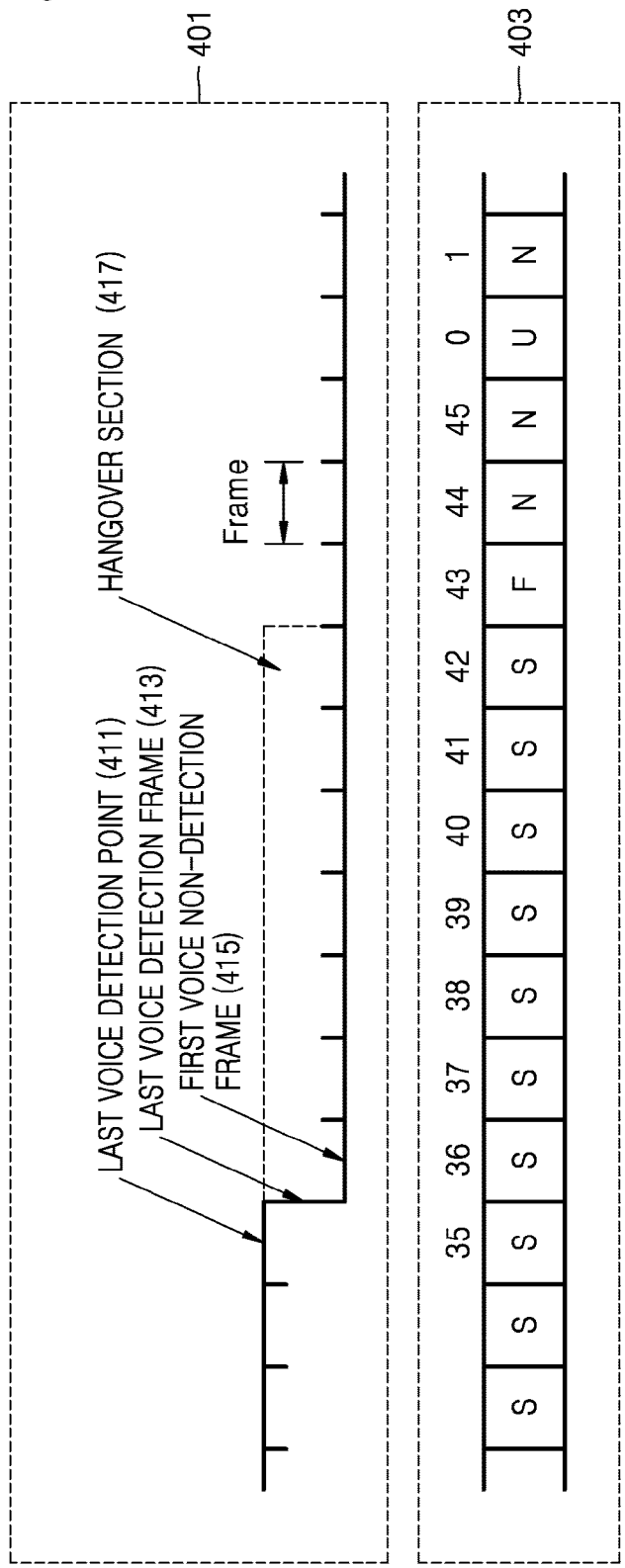

[Fig. 5]
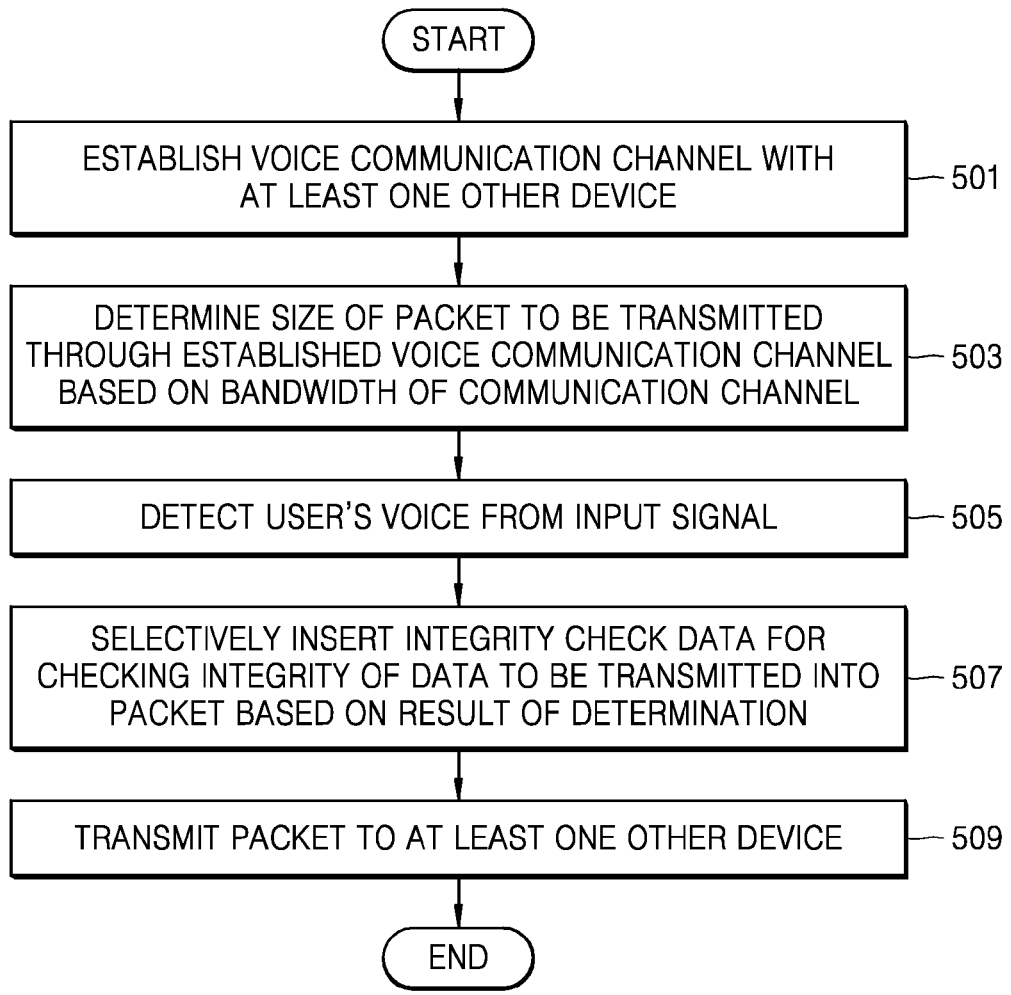

[Fig. 6]
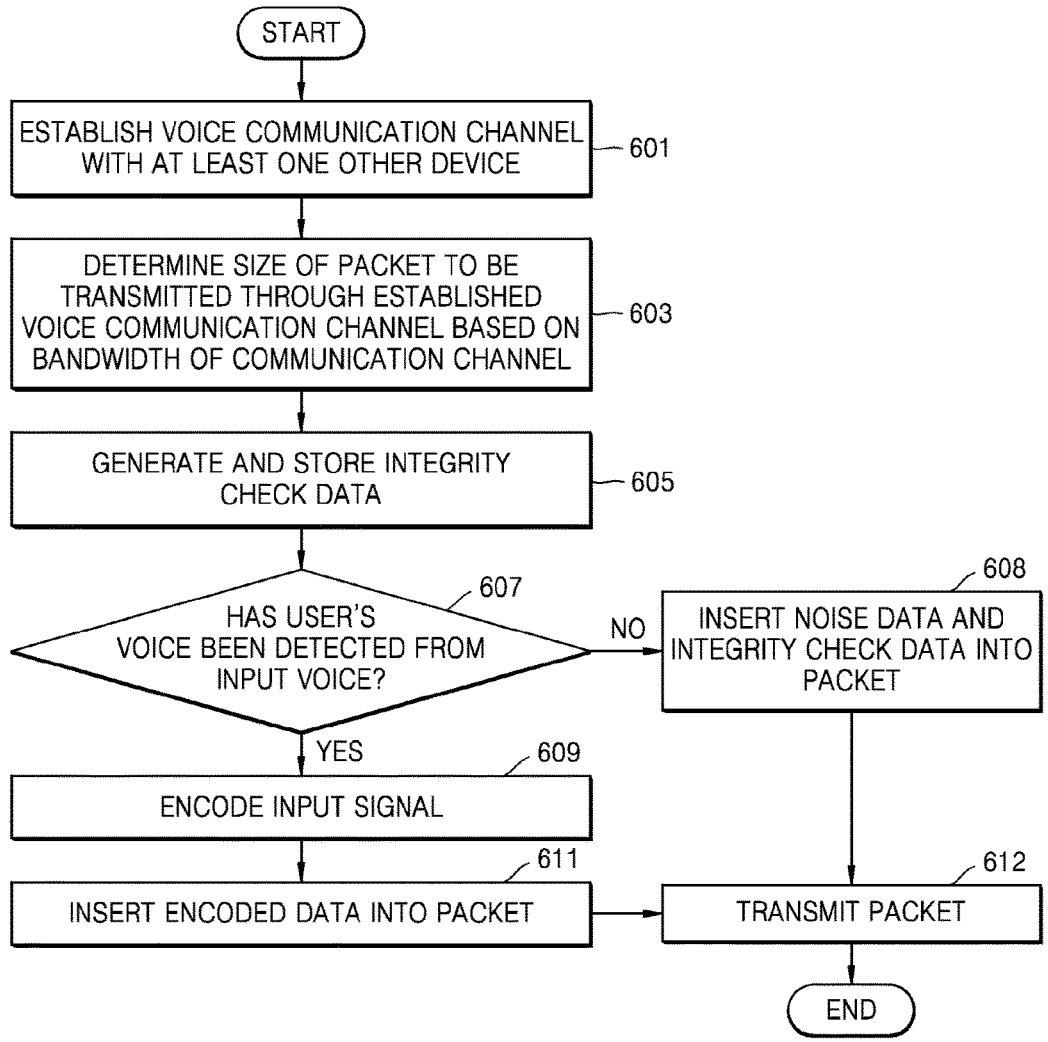
[Fig. 7]
701
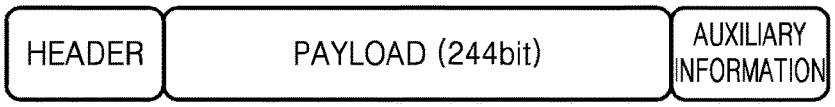
703
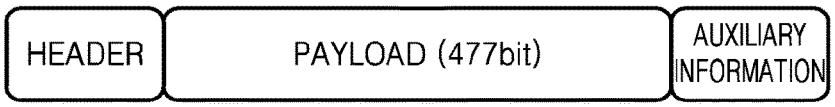

[Fig. 8]
801
803
[Fig. 9]
903
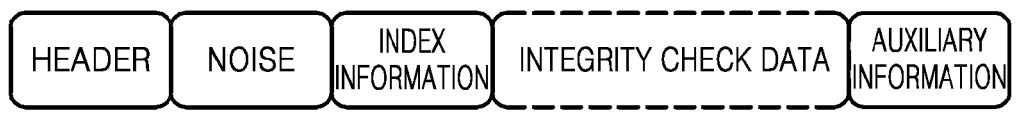
[Fig. 10]
| Bits | Description |
|---|---|
| s1-s6 | Index of 1st ISF subvector |
| s7-s12 | Index of 2st ISF subvector |
| s13-s18 | Index of 3nd ISF subvector |
| s19-s23 | Index of 4th ISF subvector |
| s24-s28 | Index of 5th ISF subvector |
| s29-s34 | Index of logarithmic frame energy |
| s35 | Dithering flag |
| s36 | 0: SID_First  1: SID_Update |
| s37-s40 | Speech_mode |

[Fig. 11]
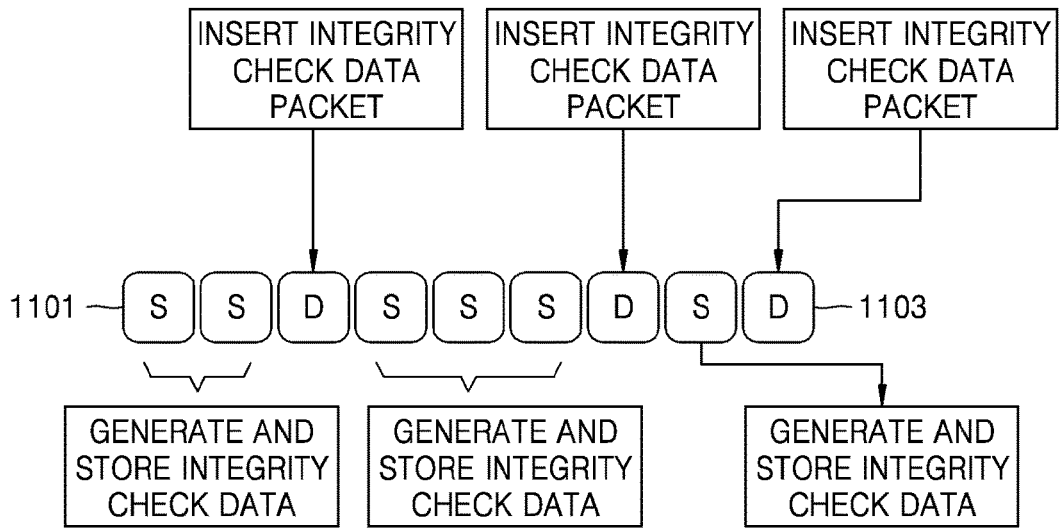
[Fig. 12]
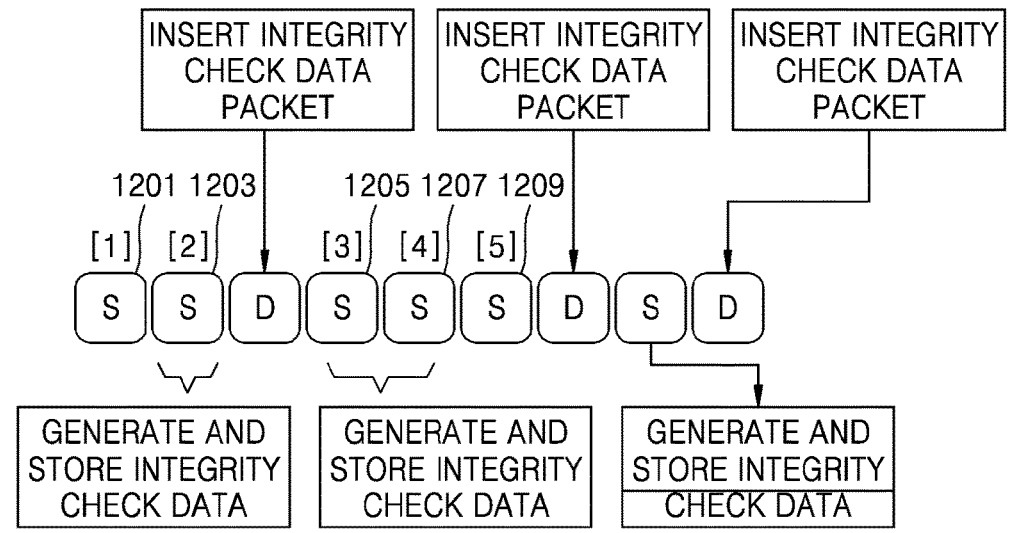

[Fig. 13]
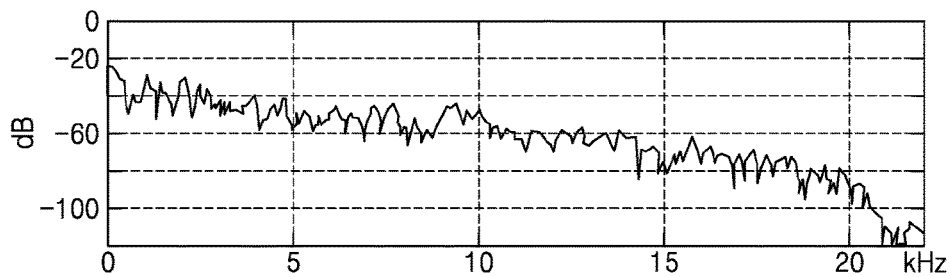
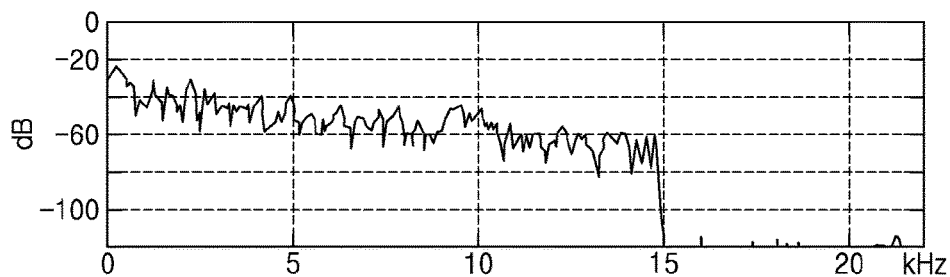
[Fig. 14]
[Fig. 15]

[Fig. 16]
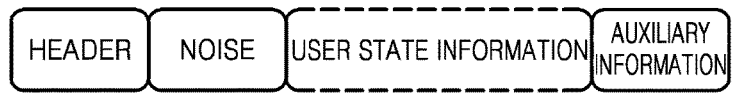
[Fig. 17]
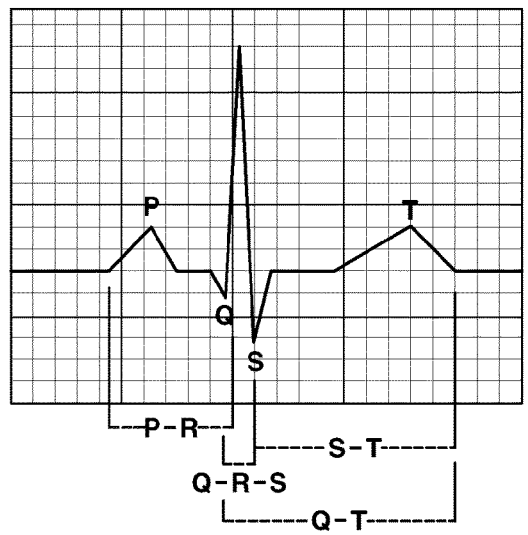
[Fig. 18]
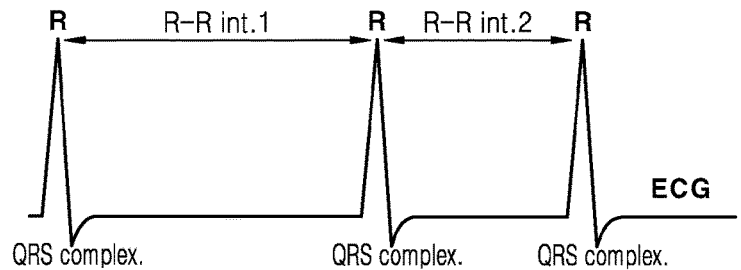
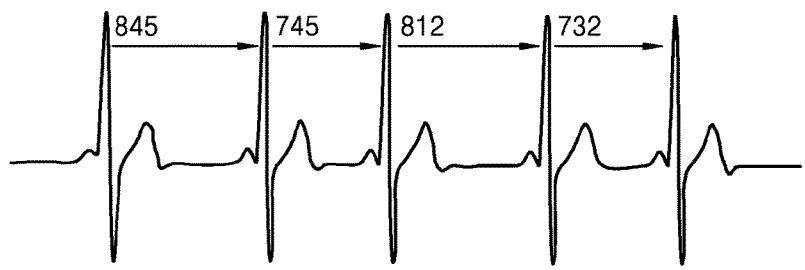

[Fig. 19]
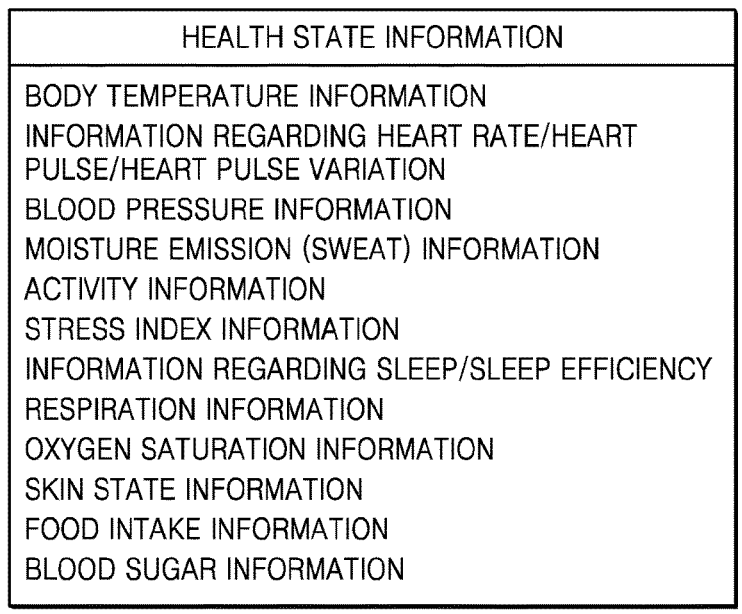
[Fig. 20]
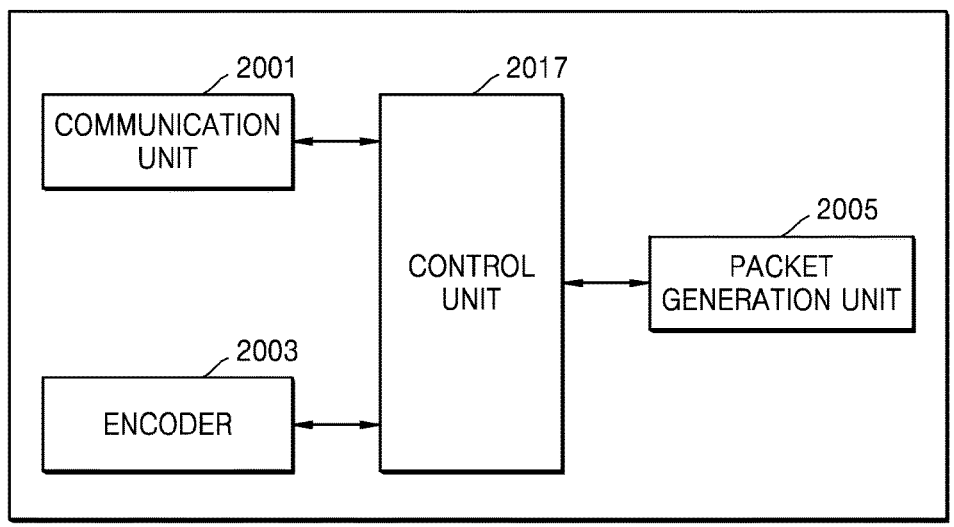

[Fig. 21]
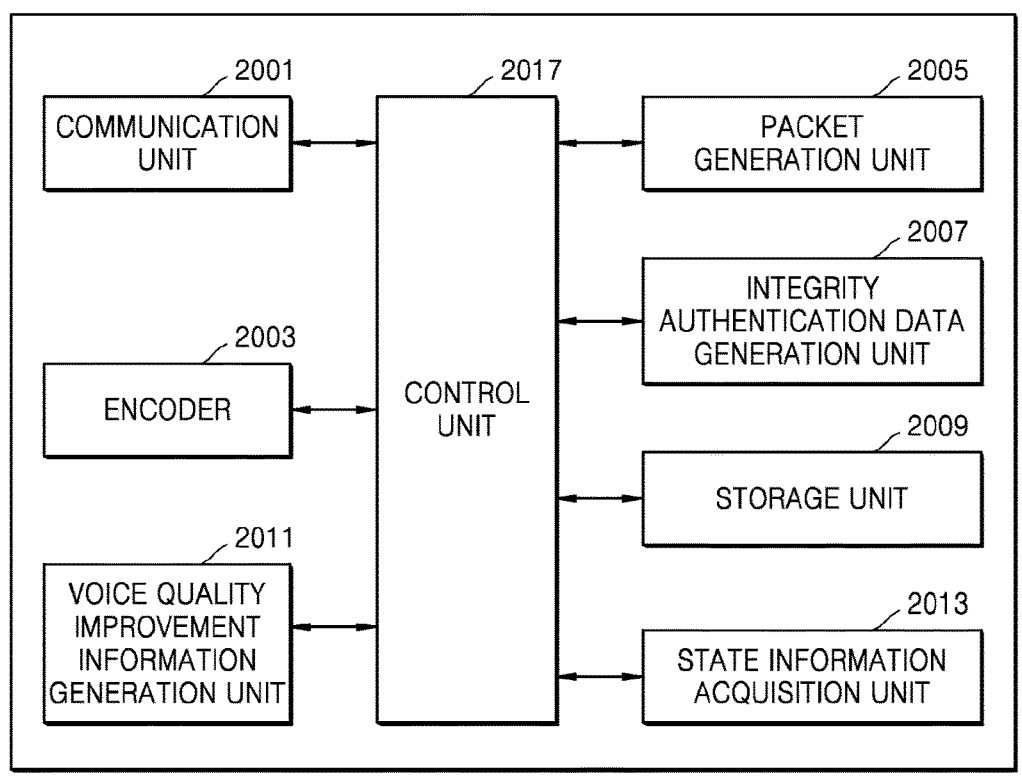

[Fig. 22]
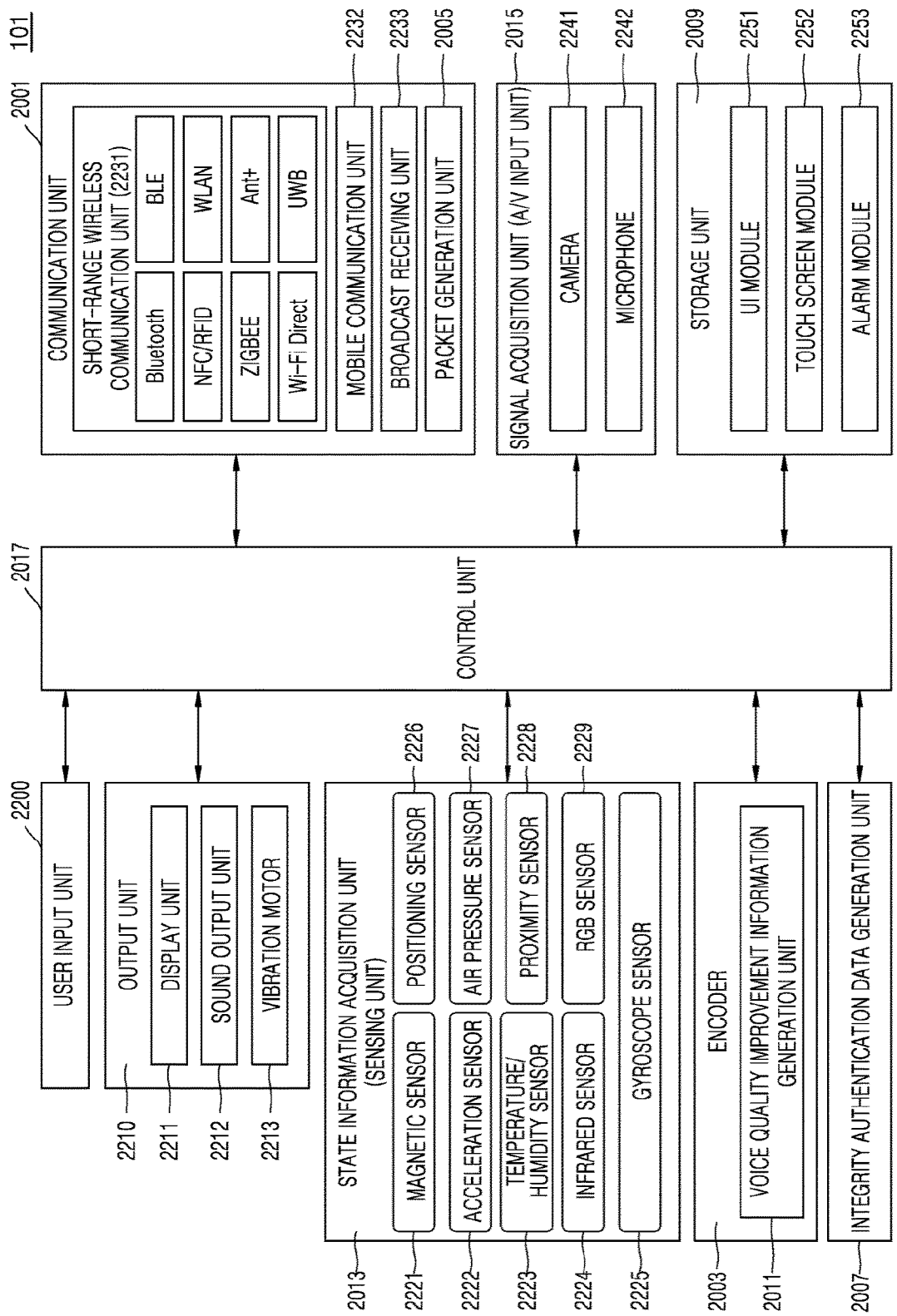

METHOD AND APPARATUS FOR PROVIDING INTEGRITY CHECK DATA

This application is the U.S. national phase of International Application No. PCT/KR2015/012785 filed 26 Nov. 2015, which designated the U.S. and claims priority to KR Patent Application No. 10-2014-0175378 filed 8 Dec. 2014, the entire contents of each of which are hereby incorporated by reference.

TECHNICAL FIELD

The present invention relates to a method of providing data, and more particularly, to a method and apparatus for providing integrity check data.

BACKGROUND ART

Along with the wide use of mobile devices, communication services provided in real time, such as voice calls or streaming with mobile devices, have rapidly increased. Due to the rapid increase of communication services, the need for security of data transmitted and received also have increased.

In the related art, a protocol such as the Secure Real-time Transport Protocol (SRTP) is used to maintain security of data provided in real time. The SRTP is a type of Real-time Transport Protocol (RTP) and is intended to secure encryption, authentication, and integrity of data included in an RTP packet, which was developed and standardized by Cisco and Ericsson.

FIG. 1 shows an example of an SRTP packet format according to the related art.

Referring to FIG. 1, an SRTP packet includes an RTP header, a payload, an SRTP master key index (MKI), and an authentication tag. The RTP header includes version information, information about the presence or absence of a padding byte, a sequence number, a time stamp, and information about a payload type. The payload includes actually transmitted data such as video/audio data. The payload of the SRTP is encrypted.

The authentication tag is data for authenticating the integrity of an SRTP packet, and the SRTP MKI is index information indicating a master key to be used for decryption when a plurality of master keys are required to decrypt an SRTP packet. The SRTP MKI may not be included in a packet according to the implementation. The authentication tag and the SRTP MKI are data used to authenticate integrity of an SRTP packet or a payload included in the SRTP packet.

For the SRTP packet shown in FIG. 1, however, integrity check data such as the authentication tag and the SRTP MKI is added separately in order to authenticate data. Accordingly, the SRTP scheme has an overhead of 25.3% (that is, 21 bytes (data needed to authenticate integrity)/83 bytes (total packet size)*100) in comparison with the RTP scheme, thus wasting bandwidth.

Furthermore, there is an inconvenience that it is impossible to perform integrity authentication on a device that does not support the SRTP.

DISCLOSURE OF INVENTION

Solution to Problem

The present invention is directed to providing a method and apparatus for avoiding wasting bandwidth and providing integrity check data that may be used in various devices.

Advantageous Effects of Invention

According to some embodiments, without any overhead, the integrity check data may be provided to various devices.

BRIEF DESCRIPTION OF DRAWINGS

FIG. 1 shows an example of an SRTP packet format according to the related art.

FIG. 2 is a view for describing devices that exchange data packets according to some embodiments.

FIG. 3 is a view for describing a method of generating integrity check data according to some embodiments.

FIG. 4 shows a frame including user voice detection information according to some embodiments.

FIG. 5 is a flowchart for describing a method of providing integrity check data according to some embodiments.

FIG. 6 is a detailed flowchart for describing a method of providing integrity check data according to some embodiments.

FIG. 7 shows a format of a packet according to some embodiments.

FIG. 8 shows a format of a packet including integrity check data according to some embodiments.

FIG. 9 shows a format of a packet including packet index information according to some embodiments.

FIG. 10 shows a configuration of bits of noise data according to some embodiments.

FIGS. 11 and 12 illustrate operations of a device on the basis of detection of a user's voice according to some embodiments.

FIG. 13 is a view for describing voice quality improvement information according to some embodiments.

FIG. 14 shows an example of a format of a packet including voice quality improvement information according to some embodiment.

FIG. 15 is a view for describing user state information according to some embodiments.

FIG. 16 shows an example of a format of a packet including user state information according to some embodiments.

FIGS. 17 to 19 are views for describing a method of analyzing user health state information according to some embodiments.

FIGS. 20 and 21 are block diagrams for describing a device configured to provide integrity check data according to some embodiments.

FIG. 22 is a detailed block diagram for describing a device configured to provide integrity check data according to some embodiments.

BEST MODE FOR CARRYING OUT THE INVENTION

One aspect of the present invention provides a method of a device transmitting integrity check data, the method including: establishing a voice communication channel with at least one other device; determining a size of a packet to be transmitted through the established voice communication channel based on a bandwidth of the communication channel; detecting a user's voice from an input signal; selectively inserting integrity check data for checking the integrity of data to be transmitted into the packet based on a result of the detection; and transmitting the packet to the at least one other device.

The selective inserting of the integrity check data into the packet may include inserting the integrity check data into the packet when the user's voice is not detected from the input signal.

The detecting of a user's voice from an input signal may further include: determining whether the user's voice has been detected from the input signal; and determining whether to encode the input signal based on a result of the determination of the detection, and the selective inserting of the integrity check data into the packet may include selectively inserting the integrity check data into the packet based on the determination of the encoding.

The method may further include: generating the integrity check data of the data to be transmitted; and storing the generated integrity check data, in which the selective inserting of the integrity check data into the packet may include inserting the stored integrity check data.

The generating may include: determining at least one of a method of generating the integrity check data and a size of the integrity check data based on the determined size of the packet; and generating the integrity check data based on the determination.

The method may further include transmitting key data used to check the integrity.

The inserting of the integrity check data into the packet when the user's voice is not detected from the input signal may include inserting noise data into the packet in addition to the integrity check data when the user's voice is not detected from the input signal.

The selective inserting of integrity check data for checking the integrity of data to be transmitted into the packet may include selectively inserting at least one of the integrity check data and voice quality improvement data into the packet.

The method may further include generating the voice quality improvement information corresponding to the determined size of the packet.

The method may further include acquiring state information of a user of the device, in which the selective inserting of the integrity check data for checking the integrity of data to be transmitted into the packet may include selectively inserting at least one of the integrity check data and the user state information into the packet.

The user state information may include information acquired from a sensor of the device or information analyzed based on the information acquired from the sensor of the device.

The method may further include acquiring data to be transmitted to the at least one other device in addition to the input signal, in which the selective inserting of the integrity check data for checking the integrity of data to be transmitted into the packet may include selectively inserting at least one of the integrity check data and the data to be transmitted into the packet.

The user state information may include health state information of the user, and the user health state information includes at least one of heart rate information, blood pressure information, blood sugar information, and respiration information.

The selective inserting of integrity check data for checking the integrity of data to be transmitted into the packet may further include inserting packet index information into the packet.

The generating of the integrity check data of the data to be transmitted may include generating the integrity check data for only a portion of the data to be transmitted.

Another aspect of the present invention provides a non-transitory computer-readable recording medium storing a computer program for executing the above-described methods.

Still another aspect of the present invention provides a device for transmitting integrity check data, the device including a communication unit configured to establish a voice communication channel with at least one other device and determine a size of a packet to be transmitted to the at least one other device through the established voice communication channel based on a bandwidth of the communication channel; an encoder configured to detect a user's voice from a signal input to the device; and a packet generation unit configured to selectively insert the integrity check data for checking the integrity of data to be transmitted into the packet based on a result of the detection.

The packet generation unit may insert the integrity check data into the packet when the user's voice is not detected from the input signal.

The encoder may determine whether the user's voice has been detected from the input signal and determines whether to encode the input signal based on a result of the determination of the detection, and the packet generation unit may selectively insert the integrity check data into the packet based on the determination of the encoding.

The device may further include: an integrity check data generation unit configured to generate integrity check data of the data to be transmitted; and a storage unit configured to store the generated integrity check data, in which the packet generation unit may insert the stored integrity check data.

The packet generation unit may determine at least one of a method of generating the integrity check data and a size of the integrity check data based on the determined size of the packet; and generates the integrity check data based on the determination.

The communication unit may transmit key data used to check the integrity.

The packet generation unit may insert noise data into the packet in addition to the integrity check data when the user's voice is not detected from the input signal.

The packet generation unit may selectively insert at least one of the integrity check data and voice quality improvement data into the packet.

The device may further include a voice quality improvement generation unit configured to generate the voice quality improvement information corresponding to the determined size of the packet.

The device may further include a state information acquisition unit configured to acquire state information of a user of the device, in which the packet generation unit may selectively insert at least one of the integrity check data and the user state information into the packet.

The user state information may include information acquired from a sensor of the device or information analyzed based on the information acquired from the sensor of the device.

The device may acquire data to be transmitted to the at least one device other than the input signal, and the packet generation unit may selectively insert at least one of the integrity check data and the data to be transmitted into the packet.

The user state information may include health state information of the user, and the user health state information includes at least one of heart rate information, blood pressure information, blood sugar information, and respiration information.

The packet generation unit may insert packet index information into the packet.

The integrity check data generation unit may generate the integrity check data for only a portion of the data to be transmitted.

Mode for the Invention

Hereinafter, embodiments of the present invention will be described in detail to be easily embodied by those of ordinary skill in the art with reference to the accompanying drawings. The exemplary embodiments may, however, be embodied in many different forms and should not be construed as being limited to the embodiments set forth herein. In the accompanying drawings, portions irrelevant to a description of the exemplary embodiments will be omitted for clarity. Moreover, like reference numerals refer to like elements throughout.

In this disclosure below, when one part (or element, device, etc.) is referred to as being "connected" to another part (or element, device, etc.), it should be understood that the former can be "directly connected" to the latter, or "electrically connected" to the latter via an intervening part (or element, device, etc.). Furthermore, when a portion "includes" an element, another element may be further included, rather than excluding the existence of the other element, unless otherwise described.

Hereinafter, embodiments of the present invention will be described in detail with reference to the accompanying drawings.

FIG. 2 is a view for describing devices that exchange data packets according to some embodiments.

According to some embodiments, a first device 101 and a second device 103 may each be a smartphone, a smart TV, a cell phone, a personal digital assistant (PDA), a laptop, a media player, a micro server, a Global Positioning System (GPS) device, an e-book terminal, a digital broadcasting terminal, a navigation device, a kiosk, an MP3 player, a digital camera, or another mobile or non-mobile computing device. In addition, the first device 101 and the second device 103 may include various devices that may receive a touch input, such as an interactive whiteboard, a touch table, or the like. It will be appreciated that embodiments of the present invention are not limited thereto. According to some embodiments, the first device 101 and the second device 103 may each be a device including a display unit.

According to some embodiments, the first device 101 and the second device 103 may receive a user input through various user interfaces such as a mouse, a keyboard, a touch pad, a track ball, an electronic pen, a touch screen, or the like. It will be appreciated that the user interface is not limited thereto. In addition, the first device 101 and the second device 103 may each be a device that may receive a signal from a user, such as a microphone and a camera.

Referring to FIG. 2, the first device 101 may establish a channel for voice communication with the device 103.

According to some embodiments, the channel for voice communication between the first device 101 and the second device 103 may include a channel having a predetermined bandwidth. In addition, according to some embodiments, the channel for voice communication between the first device 101 and the second device 103 may be a channel for transmitting a predetermined packet at predetermined intervals.

According to some embodiments, the voice communication channel of FIG. 2 may be one of a plurality of communication channels that the first device 101 establishes with another device. In addition, the first device 101 may establish the voice communication channel with at least one device including the second device 103.

Additionally, the first device 101 may establish not only the voice communication channel but also a channel for data communication with the second device 103. The data communication channel may be a channel separate from the voice channel, or data may be transmitted through the voice channel.

According to some embodiments, a procedure for channel establishment may be performed under control of a separate server. For example, when the first device 101 transmits a request for establishing a voice channel with the second device 103 to an external server, the external server transmits the channel establishment request of the first device 101 to the second device 103, and the external server may receive a response of the second device 103, thus establishing a channel between the first device 101 and the second device 103. In addition, according to some embodiments, when the first device 101 may establish the voice communication channel with the second device 103, the external server may allocate the voice communication channel having a predetermined bandwidth between the first device 101 and the second device 103.

According to some embodiments, the voice communication channel between the first device 101 and the second device 103 may have a certain bandwidth, irrespective of the size of a transmitted or received packet. That is, since the bandwidth of the voice communication channel between the first device 101 and the second device 103 may be allocated between the first device 101 and the second device 103, any other device may not use the bandwidth when the channel between the first device 101 and the second device 103 is not disconnected.

According to some embodiments, the first device 101 may determine whether a voice is detected from a signal input from a user.

When the voice is detected from the signal input from the user, in order to transmit voice data generated on the basis of the detected voice, the first device 101 may generate a packet of a first size corresponding to the bandwidth of the voice communication channel between the first device 101 and the second device 103 and may transmit the generated packet to the second device 103.

However, when the voice is not detected from the signal input from the user, the first device may not transmit a packet to the second device or may transmit a packet including noise data to the second device. The packet including the noise data may be a packet of a second size having a smaller size than the packet of the first size.

As described above, the voice communication channel established between the first device 101 and the second device 103 may be a channel having a bandwidth through which data of a predetermined size may be transmitted at predetermined intervals. The voice communication channel between the first device 101 and the second device 103 may be used only by the first device 101 and the second device 103. Accordingly, when the first device 101 generates the packet of the second size for a predetermined period of time and transmits the packet of the second size to the second device 103, there may be an extra bandwidth on the voice channel established between the first device 101 and the second device 103 for a predetermined time of period.

According to some embodiments, the first device 101 may insert integrity check data into the packet of the second size. The packet having the inserted integrity check data has a size corresponding to a bandwidth and has the same size as the packet of the first size. Accordingly, when the first device 101 transmits the packet having the inserted integrity check data to the packet of the second size instead of generating and transmitting the packet of the second size, there is not an extra bandwidth on the voice communication channel between the first device 101 and the second device 103.

Accordingly, according to some embodiments of the present disclosure, an additional bandwidth for transmitting the integrity check data is unnecessary and even an overhead is not generated. Furthermore, since a specific protocol is not used, various devices may use the integrity check data.

FIG. 3 is a view for describing a method of generating integrity check data according to some embodiments.

According to some embodiments, the integrity of data may denote that details and a source of the data have not been changed.

According to some embodiments, the first device 101 may generate an authentication code for authenticating the integrity of transmitted or received data. According to some embodiments, the first device 101 may generate a hash-based message authentication code (HMAC). It will be appreciated that the integrity authentication code includes various codes and also is generated through various methods. The first device may generate and use a code other than the HMAC.

According to some embodiments, an integrity authentication scheme using the HMAC is as follows. The first device 101 and the second device 103 share a secret key. The first device 101 calculates a hash value of data and generates an authentication code on the basis of the hash key. When the first device 101 transmits the data and the authentication code, the second device 103 may calculate a hash value from the data and compare the hash value with the received authentication code to check the integrity of the data.

According to some embodiments, the first device 101 may generate integrity check data using a hash value output by an encryption hash algorithm such as the Secure Hash Algorithm-1 (SHA-1) or Secure Hash Algorithm-2 (SHA-2). It will be appreciated that embodiments of the present invention are not limited thereto.

According to some embodiments, the integrity check data may include an authentication code. The integrity check data may include any form of data used to authenticate and verify the integrity of data or a message included in a packet.

The SHA algorithm is an encryption hash algorithm used in many security protocols and programs such as Transport Layer Security (TLS), Secure Socket Layer (SSL), Pretty Good Privacy (PGP), Secure SHell (SSH), and so on. The first device 101 may modularize and use a hash algorithm (hash function) to provide compatibility of the hash function. That is, the first device 101 may store and provide the SHA hash algorithm to another device or may use another hash algorithm to generate the integrity check data.

A method of using the SHA hash algorithm to generate the integrity check data is as shown in FIG. 3.

The first device 101 performs zero-padding such that the secret key shared with the second device 103 is equal to a block length of the hash function and performs an exclusive OR (XOR) operation with a pad-1 (inner pad). Subsequently, the first device 101 combines a value 303 obtained by performing the XOR operation with data 301 to be transmitted.

According to some embodiments, the length of the security key may be greater than half of an output length of a hash algorithm that the first device uses. For example, when the SHA-1 hash algorithm is used, an output result is 20 bytes. Thus, the first device 101 may use a secret key of 10 bytes or more. In addition, when the length of the security key is greater than an inner block size of the hash algorithm, the hash value may be used as the security key.

The first device 101 uses the hash function to calculate an intermediate hash value 307. In this case, the first device 101 may use an encryption hash function such as the SHA-1 or SHA-2. In addition, the first device may use an initialization vector upon the calculation of the intermediate hash value 307. It is obvious to those skilled in the art that the initialization vector is a value used upon encryption of a first block, and thus its detailed description will be omitted.

In addition, the first device 101 performs zero-padding such that the secret key shared with the second device 103 is equal to a block length of the hash function and performs an XOR operation with a pad-2 (outer pad). Subsequently, the first device 101 combines a value 309 obtained by performing the XOR operation with the intermediate hash value 307.

The first device 101 uses the hash function to calculate a final hash value 311. In addition, the first device may use an initialization vector upon the calculation of the final hash value 311.

According to some embodiments, the first device 101 may use the final hash value 311 as the integrity check data and may generate the integrity check data by performing a separate procedure from the final hash value 311.

According to some embodiments, the first device 101 may transmit the generated integrity check data to the second device 103.

FIG. 4 shows a frame including user voice detection information according to some embodiments.

FIG. 4 shows a voice activity detection (VAD) indicator (flag) graph 401 and a silence indicator (SID) frame 403.

According to some embodiments, the first device 101 may check whether a voice is included in a signal input from a user. That is, the first device 101 may detect whether the voice is included in the input signal. A technique of determining whether the voice is detected from the input signal is called the Voice Activity Detection (VAD).

According to some embodiments, a VAD flag may include an indicator indicating whether the first device 101 uses the VAD technique to detect the voice from the signal input from the user. Referring to the VAD flag graph 401 of FIG. 4, the first device 101 may identify a last voice detection point 411, a last voice detection frame 413, and a first voice non-detection frame 415.

In addition, referring to FIG. 4, a hangover section 417 may denote a predetermined waiting period from the first voice non-detection frame 415 to a point at which an encoder in the first device is deactivated.

According to some embodiments, the SID frame 403 may denote a frame including noise data provided to the second device 103 according to whether the first device 101 detects a user's voice. In addition, according to some embodiments, the SID may denote an indicator indicating whether to include user voice data.

According to some embodiments, referring to the SID frame 403 of FIG. 4, "S" is an abbreviation of "Speech" and indicates a frame in which user voice data is included, "F" is an abbreviation of "SID First" and indicates a first frame in which the user's voice is not detected, "N" is an abbreviation of "No data" and indicates a frame in which the voice is not included, and "U" is an abbreviation of "SID_Update" and indicates a first frame in which a frame number is updated. It will be readily apparent to those skilled in the art that the above-described indicators may be different depending on a scheme defined by the user.

FIG. 5 is a flowchart for describing a method of providing integrity check data according to some embodiments.

In S501, a first device may establish a voice communication channel with at least one other device.

According to some embodiments, the first device may establish the voice communication channel with at least one other device such as the second device 103.

According to some embodiments, the voice communication channel may include a channel for transmitting and receiving voice data of a user through various networks schemes such as Wi-Fi, Bluetooth, and Zigbee in addition to 3G and 4G (Long Term Evolution (LTE)) network schemes. According to some embodiments, the voice communication channel may be a channel for transmitting data using the Voice over Internet Protocol (VoIP). Additionally, according to some embodiments, the voice communication channel need not be a voice-communication-dedicated channel. In addition, according to an embodiment, the voice data may include video call data.

According to some embodiments, the voice communication channel may include a channel having a predetermined bandwidth. According to some embodiments, the voice communication channel may be a channel used to transmit voice data of a predetermined size to the at least one device at predetermined intervals.

According to some embodiments, a procedure for channel establishment may be performed under control of a separate server. Additionally, the voice communication channel that the first device establishes with the at least one other device may be a channel used to transmit voice data of a predetermined size to the at least one device at predetermined intervals. This corresponds to that described in FIG. 2.

In S503, the first device 101 may determine the size of a packet to be transmitted through the established voice communication channel on the basis of a bandwidth of the communication channel.

For example, when the bandwidth of the voice communication channel established in S501 has the size of 23.85 kbps, the first device may determine the size of the packet such that data may be transmitted through the voice communication channel at 23.85 Kbytes per second. In addition, according to some embodiments, the first device may also determine the size of a frame to be transmitted to the at least one device connected with the first device, such as the second device, on the basis of the bandwidth.

In S505, the first device may detect a user's voice from an input signal.

According to some embodiments, the first device may receive a signal from the user. For example, the first device may receive a sound signal through a microphone.

According to some embodiments, the sound signal may denote a signal into which various types of sounds such as a surrounding sound, noise, or the like in addition to the user's voice are converted.

According to some embodiments, the first device may detect the user's voice from the signal input from the user. According to some embodiments, the first device may detect the user's voice using the VAD technique. The VAD technique corresponds to that described in FIG. 4, and its detailed description will be omitted.

According to some embodiments, the first device may determine whether the voice is detected from the signal input from the user. That is, the first device may determine whether the user's voice is included in the input signal or whether any other sound except for the voice is not included. For example, the first device may distinguish between a voice and silence.

According to some embodiments, the first device may encode and transmit the input signal when the user's voice is detected from the input signal. However, when the user's voice is not detected from the input signal, the first device may not transmit data obtained by encoding the input signal and may transmit noise data or may not transmit the data.

According to some embodiments, when the voice is detected from the signal input from the user, the first device may generate the packet of the first size corresponding to the bandwidth of the voice communication channel established in S501 in order to transmit voice data generated on the basis of the detected voice. According to some embodiments, the packet of the first size may include data obtained by encoding the acquired signal or data obtained by encoding the voice data generated on the basis of the detected voice.

According to some embodiments, when the voice is not detected from the signal input from the user, the first device may not transmit a packet to the second device or may transmit a packet including noise data to the second device. The packet including the noise data may be a packet of a second size having a smaller size than the packet of the first size. In addition, as described above, the first device may transmit the integrity check data in addition to the packet of the second size. This will be described in S507.

In S507, the first device may selectively insert the integrity check data for checking the integrity of data to be transmitted into the packet on the basis of a result of the detection.

According to some embodiments, when the voice is detected from the signal input from the user, the first device may generate the packet of the first size corresponding to the bandwidth of the voice communication channel established in S501. Accordingly, when the voice is detected from the signal input from the user, the first device may not insert the integrity check data into the generated packet.

According to some embodiments, when the voice is not detected from the signal input from the user, the first device may generate the packet of the second size having a smaller size than the packet of the first size. When the first device transmits the packet of the second size to the at least one device through the voice communication channel, there may be an extra bandwidth on the communication channel as described above. According to some embodiments, the first device 101 may insert the integrity check data into the generated packet of the second size. The packet having the inserted integrity check data may have the same size as the packet of the first size. The first device may transmit the packet having the inserted integrity check data to the at least one device.

According to some embodiments, the first device may insert not only the integrity check data but also user state information, voice quality improvement data, or data to be transmitted other than voice data into the packet of the second size. According to some embodiments, the inserting of data into a packet may denote adding or attaching the data to the packet.

In S509, the first device may transmit the packet to the at least one other device.

According to some embodiments, the communication channel established between the first device and the at least one device may be established via a server. Accordingly, the first device may transmit the packet to the server.

According to an embodiment of the present invention, the method of FIG. 5 may be performed in a data channel instead of the voice communication channel. That is, when a channel is not the voice communication channel but has a fixed bandwidth, and also a small packet that does not use all of the fixed bandwidth is transmitted, the first device may insert additional data such as the integrity check data, voice quality improvement data, or user state information into the small packet and then transmit the packet having the inserted additional data.

FIG. 6 is a detailed flowchart for describing a method of providing integrity check data according to some embodiments.

In S601, the first device 101 may establish a voice communication channel with at least one other device. This corresponds to S501 of FIG. 5.

In S603, the first device 101 may determine the size of a packet to be transmitted through the established voice communication channel on the basis of a bandwidth of the communication channel. This corresponds to S503 of FIG. 5.

In S605, the first device may generate and store integrity check data.

According to some embodiments, the first device may generate integrity check data of data to be transmitted and store the generated integrity check data. According to some embodiments, the generated integrity check data may be stored in a storage unit such as a buffer. A method of generating the integrity check data corresponds to that described in FIG. 3.

According to some embodiments, the first device may determine at least one of the method of generating integrity check data and the size of the integrity check data on the basis of the size of the packet determined in S603.

For example, when a bandwidth of the communication channel established in S601 is 12.2 kbps, the first device may generate 160-bit integrity check data. When the bandwidth of the communication channel established in S601 is 23.85 kbps, the first device may generate 224-bit integrity check data.

In addition, according to some embodiments, the first device may use a method of generating the integrity check data using the SHA-1 hash algorithm in order to generate the 160-bit integrity check data and may use a method of generating the integrity check data using the SHA-2 hash algorithm in order to generate the 224-bit integrity check data.

According to some embodiments, the first device may transmit key data used for an integrity check to the at least one other device. According to some embodiments, the key data may include a secret key described in FIG. 3.

In S607, the first device may determine whether a user' voice has been detected from an input signal.

According to some embodiments, the first device may determine whether the user's voice has been detected and determine whether to encode the input signal on the basis of a result of the determination of the detection. This will be described in detail in S609 to S612.

According to some embodiments, the first device may determine whether the user's voice has been detected and determine an operation mode of an encoder on the basis of a result of the determination of the detection. For example, when the user's voice is detected, the first device may determine the operation mode of the encoder to allow the encoder to encode the input signal or the user's voice included in the input signal. When the user's voice is not detected, the first device may determine the operation mode of the encoder to prevent the encoder from encoding the input signal.

For example, the first device may perform encoding with an encoder such as an Adaptive Multi-channel Rate compression (AMR) codec, and the AMR codec may operate according to 14 different operation modes (e.g., the AMR mode 8 or the Discontinuous Transmission (DTX) mode). Thus, the first device may determine the operation mode of the AMR codec on the basis of whether the user's voice is detected.

In addition, the first device may determine an encoding scheme depending on the bandwidth of the channel established in S601 and the size of the packet determined in S603.

[In S609 and S611, when the user's voice is detected, the first device may encode the input signal and may insert the encoded data into a packet to be transmitted to the at least one device.

According to some embodiments, while inserting the encoded data into the packet to be transmitted to the at least one device, the first device may not insert the integrity check data into the packet.

When the user's voice is not detected, the first device may insert noise data and the integrity check data into the packet. In addition, according to some embodiments, the first device 101 may insert only the integrity check data into the packet, excluding the noise data. According to some embodiments, the first device may not encode the input signal when the user's voice is not detected.

According to some embodiments, the noise data may include parameter information for generating noise in a receiving device. According to some embodiments, the noise data may include data regarding comfort noise.

According to some embodiments, the first device may generate voice quality improvement data. The voice quality improvement data may include data for enhancing voice quality. According to some embodiments, the first device may generate the voice quality improvement data corresponding to the determined size of the packet. For example, the first device may use the extra bandwidth to transmit additional data for enhancing voice call quality to the at least one device, thus enhancing the voice call quality.

According to some embodiments, the first device may insert at least one of the integrity check data and the voice quality improvement data into the packet to be transmitted to the at least one device. This will be described in detail in FIG. 11.

According to some embodiments, the first device may acquire user state information. According to some embodiments, the user state information may include information acquired from a sensor of the first device or information analyzed on the basis of the information acquired from the sensor of the first device. For example, the user state information may include information regarding an emotion or a health state of a user, which is analyzed on the basis of user body information such as a body temperature or heart rate of the user.

According to some embodiments, the first device may acquire the user state information during voice communication and may use the extra bandwidth to transmit the acquired user state information to the at least one device with which a voice channel is established. According to some embodiments, the first device may insert at least one of the integrity check data and the user state information into a packet to be transmitted to the at least one device.

In addition, according to some embodiments, the first device may acquire data to be transmitted to the at least one other device other than the input signal.

According to some embodiments, the input signal may include a sound signal currently received by a device through a microphone, and the data to be transmitted to the at least one other device, other than the input signal, may include data regarding an image, a text, and a video other than the sound signal.

For example, the first device may acquire image data through a camera according to a user input during voice communication. The first device may use the extra bandwidth to transmit the acquired image data to the at least one device with which the voice channel is established.

According to some embodiments, the first device may insert at least one of data to be transmitted to the at least one other device in addition to the integrity check data and the input signal into the packet to be transmitted to the at least one device.

FIG. 7 shows an example of a format of a packet according to some embodiments.

Referring to FIG. 7, a 3G communication packet 701 is a packet transmitted or received through a 3G network and may include a header, a payload, and auxiliary information. In addition, an LTE communication packet 703 is a packet transmitted or received through an LTE network and may include a header, a payload, and auxiliary information, similarly to the 3G communication packet 701. However, the LTE communication packet 703 has a different size from the 3G communication packet 701.

According to some embodiments, a packet 701 or 703 of FIG. 7 may be a packet having a payload into which the data obtained by encoding the input signal is inserted. The packet 701 or 703 of FIG. 7 may be a packet generated when the above-described first device has detected the user's voice from the input signal. That is, the packet 701 or 703 of FIG. 7 may denote the packet of the first size corresponding to the bandwidth described in FIG. 2. Accordingly, the packet 701 or 703 of FIG. 7 does not include integrity check data.

According to some embodiments, the first device may determine whether to generate the LTE communication packet 703 or the 3G communication packet 701 on the basis of the bandwidth of the established voice communication channel.

FIG. 8 shows an example of a format of a packet including integrity check data according to some embodiments.

Referring to FIG. 8, a 3G communication packet 801 may include a header, noise data, integrity check data, and auxiliary information. In addition, an LTE communication packet 803 may also include a header, noise data, integrity check data, and auxiliary information, similarly to the 3G communication packet. However, as described above, the LTE communication packet 803 has a different size from the 3G communication packet 801.

In comparison with the packet 701 or 703 of FIG. 7, a packet 801 or 803 of FIG. 8 has a payload in which the noise data and the integrity check data are included. According to some embodiments, the packet 801 or 803 of FIG. 8 may be a packet into which the data obtained by encoding the input signal is not inserted and the noise data and the integrity check data are inserted.

As described above, the packet 801 or 803 of FIG. 8 may be a packet generated when the first device has not detected the user's voice from the input signal. That is, the packet 801 or 803 of FIG. 8 may be a packet obtained by inserting the integrity check data into the packet of the second size described in FIG. 2.

In the related art, the packet 801 or 803 of FIG. 8 is transmitted without the integrity check data. As described above, when the voice is not detected, the first device transmits only the noise data. Thus the first device may transmit the packet of the second size smaller than that of the packet 701 or 703 of FIG. 7 (the packet of the first size) to at least one device.

However, since a bandwidth of an allocated channel does not vary, there is an extra bandwidth on the channel. The first device may use the extra bandwidth to transmit the integrity check data. That is, the first device may insert 160 or 224 bits of integrity check data into a packet to be transmitted such as the packet 801 or 803 and then transmit the packet having the inserted integrity check data.

Additionally, according to some embodiments, the first device may add only the integrity check data to a packet to be transmitted, excluding the noise data, and then transmit the packet having the added integrity check data or may transmit a packet including only the noise data. In addition, as described above, the first device may insert not only the integrity check data but also user state information, voice quality improvement data, or data other than voice data in the packet.

FIG. 9 shows a format of a packet including packet index information according to some embodiments.

According to some embodiments, a first device may transmit voice data or data other than the voice data to a second device. The second device, which is receiving data, may selectively perform an integrity check on the packet received from the first device. For example, the second device may perform the integrity check on an even-numbered or odd-numbered packet when the packet is received. In addition, the second device may selectively perform the integrity check on the basis of packet index information included in the received packet.

According to some embodiments, the first device may insert the packet index information into the packet to be transmitted. According to some embodiments, when a user's voice is not detected from a signal input from the first device, the first device may insert the integrity check data and the packet index information into the packet.

According to some embodiments, the packet index information may include at least one of an order in which the packet is generated (a packet order), a type of data included in the packet (or payload), a size of the packet (or payload), and information regarding in which packet among the previously transmitted packets data whose integrity is to be checked by the integrity check data included in the packet is included.

According to some embodiments, the second device may selectively perform the integrity check on the basis of information included in the packet index information. For example, the second device may perform the integrity check on only a packet including predetermined data and may refer to an order in which a packet is generated by the first device and perform the integrity check on only an even-numbered or odd-numbered packet. It will be appreciated that the second device may randomly select a packet and perform the integrity check on the selected packet.

In addition, an omission, loss, or error may occur in a packet in transmission due to various causes such as signal attenuation, fading, and noise. When the second device, which is a receiving device, performs the integrity check on the packet in which the omission, loss, or error has occurred, integrity of the packet in which the omission, loss, or error has occurred may not be authenticated. Accordingly, the second device may identify the packet in which the omission, loss, or error has occurred by referring to the packet index information, and thus may not perform the integrity check.

In addition, according to some embodiments, when the integrity check is not performed more than a predetermined number of times, the second device may determine that the integrity of the packet is not authenticated.

According to some embodiments, when the number of packets or consecutive packets in which an omission, loss, or error occurs is greater than a predetermined number, the second device may determine whether the integrity of the packet is not authenticated.

According to some embodiments, when the integrity of the packet is not authenticated, the first device or the second device may disconnect or reconnect the communication channel.

FIG. 10 shows a configuration of bits of noise data according to some embodiments.

Referring to FIG. 10, first to twenty-eighth bits represent information on first to fifth Immittance Spectral Frequency (ISF) vectors. According to some embodiments, the ISF vector may denote parameter information used for an encoder to generate the noise data that is inserted into a voice communication packet when a voice is not detected.

Twenty-ninth to thirty-fourth bits may represent information regarding log frame energy, and the log frame energy may denote a parameter used to generate the noise data.

A thirty-fifth bit may be a dithering flag bit. The dithering flag bit may indicate whether a decoder will perform dithering. The dithering may denote a technique of adding predetermined noise data such that a user feels comfortable in listening.

A thirty-sixth bit may denote the above-described SID and indicate information whether to include the user's voice (SID First), whether to be data including the noise data, or whether to be a frame whose number is changed.

Thirty-seventh to fortieth bites are a mode indicator and may indicate information (e.g., an encoding rate) regarding an operation of an encoder.

The configuration of bits of the noise data shown in FIG. 10 is an example. It is obvious to those skilled in the art that the bit configuration may be changed according to the definition of the user and the form of generating the noise data.

FIGS. 11 and 12 illustrate operations of a device on the basis of detection of a user's voice according to some embodiments.

Referring to FIG. 11, "S" 1101 is an abbreviation of "Speech" and denotes that a voice is detected, and "D" 1103 is an abbreviation of "Discontinuous transmission" and denotes that the voice is not detected.

According to some embodiments, the first device may receive a signal from the user. According to some embodiments, the first device may receive a sound signal from the user. For example, the first device may receive the sound signal from the user through a microphone.

According to some embodiments, when a voice is detected from the input signal, the first device encodes the input signal and inserts the encoded data into a packet. In this case, the first device may generate and store integrity check data for authenticating the integrity of the encoded data inserted into the packet. When the packet having the inserted encoded data is transmitted, there is no extra bandwidth. Thus, the first device does not insert the integrity check data into the packet.

According to some embodiments, when the voice is not detected from the input signal, the first device does not encode the input signal. The first device may insert integrity check data that has been stored in a packet including only noise data. That is, the first device may insert integrity check data of data that is previously encoded, transmitted, and stored into a packet to be currently transmitted.

In other words, the first device may buffer the integrity check data. When the size of the packet to be transmitted is small since the voice is not detected, the first device may insert the buffered integrity check data into the packet and then transmit the packet having the buffered integrity check data.

For example, the first device may transmit the integrity check data to at least one device without an overhead by buffering the integrity check data. Additionally, according to some embodiments, the first device may store only integrity check data of a predetermined size.

Referring to FIG. 12, the first device may generate and store integrity check data for only a portion of data to be transmitted to the second device. According to some embodiments, the first device may generate the integrity check data for only some of a plurality of packets to be transmitted.

As described in FIG. 11, the first device may receive a signal from the user. When the voice is detected from the input signal, the first device may encode the input signal and insert the encoded data into the packet to be transmitted. In addition, the first device may transmit the packet having the inserted encoded data to the second device.

According to some embodiments, when the voice is not detected from the input signal, the first device may not encode the input signal and may insert the noise data and the integrity check data into the packet to be transmitted. The integrity check data may be data used to verify the integrity for previously transmitted encoded data. An operation of the first device according to the voice detection corresponds to that described above, and thus its detailed description will be omitted.

According to some embodiments, the first device may receive a sound signal from the user. For example, the first device may receive the sound signal from the user through a microphone. Sound signals may be consecutively input without separate divided sections. For convenience, however, separate sections in which the sound signals are input will be assumed in the following description.

When the voices are detected in sections 1 and 2, the first device encodes the input signal and inserts the encoded data into the packet. In this case, as described in FIG. 11, the first device may generate and store the integrity check data for authenticating the integrity of the encoded data inserted into the packet.

However, in comparison with FIG. 11, the first device may generate and store integrity check data for data corresponding to a signal input in section 2 and may not generate and store integrity check data for data corresponding to a signal input in section 1. That is, the first device may generate and store the integrity check data for only data corresponding to a portion of the input data. As described above, the storing of the integrity check data may include buffering the integrity check data.

In addition, as described in FIG. 11, when the voice is not detected from the input signal, the first device may insert the buffered integrity check data into the packet to be transmitted. In other words, the first device may generate and buffer the integrity check data for only the data corresponding to the signal input in section 2 and may insert the buffered integrity check data into the packet to be transmitted.

According to some embodiments, the above-described method may also be applied to signals input in sections 3, 4, and 5. That is, the first device may generate and store the integrity data for only the signals input in sections 3 and 4 and may not generate and store the integrity data for the signal input in section 5.

Additionally, when the first device inserts the integrity check data into the packet to be transmitted to the second device, the first device may further insert packet index information into the packet.

According to some embodiments, the packet index information may include at least one of an order in which a packet is generated by the first device (a packet generation order), a type of data included in the packet (or payload), a size of the packet (or payload), and information regarding in which packet data whose integrity is to be checked by the integrity check data included in the packet is included. In addition, the packet index information may include information regarding whether the integrity check data is generated for the data included in the packet.

According to some embodiments, the second device, which is a receiving device, may determine whether the integrity check data of the data included in the received packet is generated and determine whether to check the integrity of the received packet on the basis of the packet index information.

FIG. 13 is a view for describing voice quality improvement information according to some embodiments.

FIG. 13 shows a graph of a sound signal 1301 before encoding and a graph of a sound signal 1303 after encoding.

According to some embodiments, the first device encodes and transmits a predetermined frequency band range of a sound signal to at least one other device. According to some embodiments, the first device may not encode high-frequency components higher than about 14 to 15 kHz, which is hardly audible by humans, and may encode only components equal to or lower than about 14 to 15 kHz. It will be readily apparent to those skilled in the art that the frequency band range of the sound signal encoded by the first device may be changed on the basis of a user input, conditions of a bandwidth, or the like.

According to some embodiments, upon receiving the encoded sound signal (or voice data) from the first device, the at least one device may decode the received encoded sound signal.

However, when a certain frequency band (e.g., a frequency band of about 14 to 15 kHz or higher) is not encoded, essential components constituting the voice may be omitted. Accordingly, when the voice is played back, sound quality of the voice may be degraded. Accordingly, in order to enhance the sound quality, the high-frequency band may be restored. Accordingly, upon receiving the encoded sound signal (or voice data) from the first device, the device may estimate and restore data in high-frequency bands. A technique of estimating and restoring data in high-frequency bands is called BandWidth Estimation (BWE).

The BWE technique may be classified into blind BWE and guided BWE. The blind BWE is a scheme in which a device predicts a high-frequency band without auxiliary data, and the Guided BWE is a scheme in which a device predicts a high-frequency band on the basis of auxiliary data for quality improvement. The guided BWE has better sound quality than the blind BWE, but a transmitting device such as the first device to separately transmit auxiliary data is needed. The auxiliary data is not essential, and thus, an additional bandwidth may be allocated to transmit the auxiliary data in order to restore the high-frequency band. However, when the additional bandwidth is allocated, an appropriate bandwidth may not be allocated to a communication channel with another device, thus disabling a voice call or causing call drop between devices involved in voice communication.

However, according to embodiments of the present invention, as described above, when data to be inserted into a packet is small because a user's voice is not sensed, there is a remaining bandwidth in a previous allocated channel. Thus, the first device may further insert voice quality improvement information for enhancing voice quality in a packet and thus provide the voice quality improvement information to the at least one device. According to some embodiments, the voice quality improvement information may include auxiliary data for quality improvement.

FIG. 14 shows an example of a format of a packet including voice quality improvement information according to some embodiment.

In comparison with the packet 701 or 703 of FIG. 7, a packet 1401 of FIG. 14 has a payload including noise data and voice quality improvement information. According to some embodiments, the packet 1401 of FIG. 14 may be a packet into which the data obtained by encoding the input signal is not inserted and the noise data and the integrity check data are inserted. As described in FIGS. 7 and 8, the size of the packet may be changed depending on the communication channel bandwidth (e.g., the 3G communication packet 701 and the LTE communication packet 703 of FIG. 7).

As described above, the packet 1401 of FIG. 14 may be a packet generated when the first device has not detected the user's voice from the input signal. That is, the packet 1401 of FIG. 14 may be a packet obtained by the first device inserting the voice quality improvement information into the packet of the second size described in FIG. 2.

In the related art, the first device generates and transmits the packet without including the voice quality improvement information. As described above, when the voice is not detected, the first device transmits only the noise data. Thus, the first device may transmit the packet of the second size smaller than that of the packet 701 or 703 of FIG. 7 (the packet of the first size) to at least one device. However, an allocated channel bandwidth is not varied. Thus, in order to use an extra bandwidth to transmit the voice quality improvement information, the first device may insert the voice quality improvement information into a packet to be transmitted such as the packet 1401 of FIG. 14 and then transmit the packet having the inserted voice quality improvement information.

Additionally, according to some embodiments, the first device may add only the voice quality improvement information to a packet to be transmitted, excluding the noise data, and then transmit the packet having the added voice quality improvement information or may transmit a packet including only the noise data. The first device may also transmit a packet including at least one of the noise data, the voice quality improvement information, and the integrity check data.

FIG. 15 is a view for describing user state information according to some embodiments.

According to some embodiments, the first device may acquire user state information.

According to some embodiments, the user state information may include information acquired from a sensor of the first device or information analyzed on the basis of the information acquired from the sensor of the first device. In addition, the user state information may also include, but is not limited to, user health information such as an electrocardiogram, a heart rate, and a body temperature and may further include information regarding a moving speed or an emotion.

Referring to FIG. 15, the first device is in contact with a body part of the user such as a hand or a face during a voice call, and thus may acquire information regarding a body temperature, a heart rate, etc. of the user. During the voice call, the first device may also acquire information regarding a face, a mouth shape, a pupil, and an iris of the user.

Additionally, according to some embodiments, the first device may acquire information regarding a current position and a moving speed of the user on the basis of an acceleration sensor or a Global Positioning System (GPS) sensor and may acquire information regarding the surrounding environment around the user using an atmosphere sensor and a temperature/humidity sensor. However, a method of acquiring the user state information is not limited thereto.

In addition, according to some embodiments, the first device may also analyze an emotional state or health state on the basis of acquired heart rate information during a voice call and an acquired change in the user's pupil during a video call.

According to some embodiments, the first device may use an extra bandwidth to transmit the user state information to at least one device.

FIG. 16 shows an example of a format of a packet including user state information according to some embodiments.

In comparison with the packet 701 or 703 of FIG. 7, a packet 1601 of FIG. 16 has a payload in which noise data and user state information are included. According to some embodiments, the packet 1601 of FIG. 16 may be a packet into which the data obtained by encoding the input signal is not inserted and the noise data and the voice quality improvement information are inserted. As described in FIGS. 7 and 8, the size of the packet may be changed depending on the communication channel bandwidth (e.g., the 3G communication packets 701 and 801 and the LTE communication packets 703 and 803 of FIGS. 7 and 8).

As described above, the packet 1601 of FIG. 16 may be a packet generated when the first device has not detected the user's voice from the input signal. That is, the packet 1601 of FIG. 16 may be a packet obtained by inserting the user state information into the packet of the second size described in FIG. 2.

In the related art, the first device generates and transmits the packet without including the user state information. As described above, when the voice is not detected, the first device transmits only the noise data. Thus the first device may transmit the packet of the second size smaller than that of the packet 701 or 703 of FIG. 7 (the packet of the first size) to at least one device. However, an allocated channel bandwidth is not varied. Thus, in order to use an extra bandwidth to transmit the user state information, the first device may insert the user state information into a packet to be transmitted such as the packet 1601 of FIG. 16 and then transmit the packet having the user state information.

Additionally, according to some embodiments, the first device may add only the user state information to a packet to be transmitted, excluding the noise data, and then transmit the packet having the added use state information or may transmit a packet including only the noise data. The first device may also transmit a packet including at least one of the noise data, the voice quality improvement information, the user state information, and the integrity check data.

Additionally, according to some embodiments, the first device may insert data to be transmitted other than the encoded voice data into the packet, instead of the user state information. This corresponds to that described above.

According to some embodiments, the first device may acquire data to be transmitted other than a sound signal received through a microphone and may insert the data to be transmitted other than the sound signal received through the microphone into the packet of FIG. 16, instead of the user state information. It will be appreciated that the first device may insert at least one of the user state information and the data to be transmitted according to a total size of the packet and the data to be inserted.

That is, when the user's voice is not detected, the first device may generate and transmit a packet including at least one of the noise data, the voice quality improvement information, the user state information, the integrity check data, and the data to be transmitted other than the sound or voice signal.

FIGS. 17 to 19 are views for describing a method of analyzing user health state information according to some embodiments.

According to some embodiments, the first device may acquire user state information. The user state information may include the user health state information. For example, the first device may acquire information regarding an electrocardiogram or heart rate of a user as shown in FIGS. 17 and 18.

According to some embodiments, the first device may record the electrocardiogram or measure heart rate on the basis of at least one electrode included in the first device. However, embodiments of the present invention are not limited thereto, and the first device may record the electrocardiogram or measure heart rate through various methods.

The electrocardiogram represents an electrical activity of a heart as a graph and records an electrical activity occurring when the heart contracts and expands to pump blood. The heart rate denotes the number of times the heart beats per minute.

FIG. 17 shows a graph according to electrocardiogram (ECG) information. Referring to FIG. 17, point P indicates a change in voltage due to the depolarization of the atrium, segment Q-R-S indicate a change in voltage due to the depolarization of the ventricle, and point T indicates a change in voltage due to the repolarization of the ventricle. The heart rate indicates the number of times the heart beats per minute, which is obtained by measuring distances between segments Q-R-S. The electrocardiogram and the heart rate are obvious to those skilled in the art, and thus their detailed description will be omitted.

Referring to FIG. 18, a first graph 1801 is a graph representing R-peaks according to heartbeats, and a second graph 1803 is a graph representing the heart rate. The first device may acquire information regarding the heat rate shown in the first graph 1801 and the second graph 1803 by acquiring electrocardiogram information according to an electrical activity of the heart. According to some embodiments, the first device may acquire a mean distance between R-peaks (Mean RR) and a mean heart rate variability (Mean HRV) on the basis of the acquired heart rate information.

According to some embodiments, the first device may analyze a user state on the basis of the acquired various information regarding the heart rate.

For example, the first device may determine whether the user is in tachycardia on the basis of the information regarding the heart rate as shown in FIG. 18. The tachycardia denotes a case in which the number of heartbeats per minute increases to over 100 and may be caused by various reasons such as a cardiac function trouble, autonomic nervous system imbalance, sleep deprivation, arrhythmia, and a lung disease.

According to some embodiments, the first device may determine the tachycardia when the Mean RR is less than a predetermined distance or when the mean HRV is equal to or greater than 90. In addition, the first device may determine bradycardia when the mean HRV is equal to or less than 60 and may determine a normal state when the mean HRV is between 60 and 90.

In addition, according to some embodiments, the first device may analyze an emotional state (stressful, uneasy, nervous, etc.) and a heath state (a cardiac function trouble, autonomic nervous system imbalance, sleep deprivation, etc.) of the user on the basis of whether the user has the tachycardia. Furthermore, the first device may analyze state information of the user (strenuous exercise, excessive caffeine intake, excessive nicotine intake, etc.) in addition to the emotional state and health state of the user.

FIG. 19 shows health state information that may be acquired by the first device.

According to some embodiments, the first device may acquire at least one of body temperature information, information regarding a heart rate/heart pulse/heart pulse variation, blood pressure information, moisture emission information, activity information, stress index information, information regarding sleep/sleep efficiency, respiration information, oxygen saturation information, skin state information, food intake information, and blood sugar information. However, embodiments of the present invention are not limited thereto.

For example, the first device may use a temperature/humidity sensor to acquire temperature information, skin state information, and moisture emission information of a user. In addition, the first device may acquire at least one of information regarding a heart rate/heart pulse/heart pulse variation and blood pressure information of a user through an electrode included in the first device or another device (e.g., a wearable device) connected with the first device (in a wired or wireless manner). In addition, the first device may acquire activity information of a user using an acceleration sensor or GPS sensor.

According to some embodiments, the first device may acquire at least one of body temperature information, information regarding a heart rate/heart pulse/heart pulse variation, blood pressure information, moisture emission information, activity information, stress index information, information regarding sleep/sleep efficiency, and noninvasive blood sugar information, without a separate user input.

In addition, according to some embodiments, the first device may acquire at least one of respiration information, oxygen saturation information, skin state information, food intake information, and blood sugar information by receiving a user input to start measuring at least one of the respiration information, the oxygen saturation information, the skin state information, the food intake information, and the blood sugar information. It will be appreciated that the health state information may be acquired without a separate user input depending on measuring methods.

According to some embodiments, the first device may use a sensor included in the first device or a sensor included in a device (e.g., wearable device) connected with the first device to acquire the health state information of the user during a certain time period. For example, the first device may acquire information regarding an electrocardiogram for 24 to 48 hours or 7 to 30 days (long term).

According to some embodiments, the first device may insert information regarding a user's health state acquired when the user is performing communication into a packet as described in FIG. 16 and thus, may instantly transmit electrocardiogram information to a user of a receiving device.

FIGS. 20 and 21 are block diagrams for describing a device configured to provide integrity check data according to some embodiments.

However, not all of the elements shown in FIGS. 20 and 21 are essential to the first device 101. The first device 101 may be implemented with more elements than those shown in FIGS. 20 and 21 or may be implemented with fewer elements than those shown in FIGS. 20 and 21. In addition, each element of the first device 101 may include a processor.

Referring to FIG. 20, the first device 101 may include a communication unit 2001, an encoder 2003, a packet generation unit 2005 and a control unit 2017.

According to some embodiments, the communication unit 2001 may establish a voice communication channel with at least one other device. In addition, the communication unit 2001 may determine the size of the packet to be transmitted to the at least one device through the communication channel.

According to some embodiments, the voice communication channel may include a channel for transmitting and receiving voice data of a user through various networks schemes such as Wi-Fi, Bluetooth, and Zigbee in addition to 3G and 4G (Long Term Evolution (LTE)) network schemes. This corresponds to that described above.

According to some embodiments, the voice communication channel may include a channel having a predetermined bandwidth. In addition, the voice communication channel that the first device establishes with the at least one other device may include a communication channel through which data of a predetermined size may be communicated at predetermined intervals.

According to some embodiments, the communication unit 2001 may also determine a size of a frame to be transmitted to the at least one device on the basis of a bandwidth of the established voice communication channel.

Additionally, according to some embodiments, the communication unit 2001 may transmit a packet generated by the packet generation unit 2005 to the at least one other device. The communication unit 2001 may transmit key data used for an integrity check to the at least one other device. According to some embodiments, the key data may include a secret key described in FIG. 3.

According to some embodiments, the encoder 2003 may detect a user's voice from a signal input through the first device 101.

According to some embodiments, the first device 101 may receive a signal from the user. For example, the first device 101 may receive a sound signal through a microphone.

According to some embodiments, the encoder 2003 may detect the user's voice from the signal input from the user. According to some embodiments, the first device may detect the user's voice using the VAD technique. This corresponds to that described in FIG. 4.

According to some embodiments, the encoder 2003 may determine whether the voice is detected from the signal input from the user. That is, the encoder 2003 may determine whether the user's voice is included in the input signal or whether any other sound except for the voice is not included.

According to some embodiments, the encoder 2003 may encode the input signal when the user's voice is detected from the input signal. However, when the user's voice is not detected from the input signal, the encoder 2003 may not encode the input signal.

According to some embodiments, the encoder 2003 may determine whether the user's voice has been detected and determine an operation mode of the encoder on the basis of a result of the determination of the detection. In addition, the encoder 2003 may determine an encoding scheme according to the bandwidth of the channel established in S601 of FIG. 6 and the size of the packet determined in S603 of FIG. 6.

According to some embodiments, the encoder 2003 may encode the input signal when the user's voice is detected from the input signal, and may not encode the input signal when the user's voice is not detected from the input signal.

According to some embodiments, when the voice is detected from the signal input from the user, the packet generation unit 2005 may generate the packet of the first size corresponding to the bandwidth of the voice communication channel established in S501 in order to transmit voice data generated on the basis of the detected voice. Depending on the implementations, the packet generation unit 2005 may be included in the communication unit 2001.

According to some embodiments, when the voice is not detected from the signal input from the user, the packet generation unit 2005 may not generate a packet or may generate a packet including noise data. The packet including the noise data may be a packet of a second size having a smaller size than the packet of the first size including the voice data.

According to some embodiments, the noise data may include parameter information for generating noise in a receiving device. According to some embodiments, the noise data may include data for generating comfort noise.

According to some embodiments, the packet generation unit 2005 may selectively insert the integrity check data for checking the integrity of data to be transmitted into the generated packet on the basis of a result of the detection of the user's voice by the encoder 2003.

According to some embodiments, when the voice is detected from the signal input from the user, the packet generation unit 2005 may generate the packet of the first size corresponding to the bandwidth of the established voice communication channel. In this case, the packet generation unit 2005 may not insert the integrity check data into the generated packet.

According to some embodiments, when the voice is not detected from the signal input from the user, the packet generation unit 2005 may generate the packet of the second size having a smaller size than the packet of the first size. The packet generation unit 2005 may insert the integrity check data into the generated packet of the second size. The packet having the inserted integrity check data may have the same size as the packet of the first size.

According to some embodiments, the packet generation unit 2005 may insert not only the integrity check data but also user state information, voice quality improvement data, and data to be transmitted other than voice data into the packet of the second size.

According to some embodiments, the communication unit 2001 may transmit a packet generated by the packet generation unit 2005 to the at least one other device.

According to some embodiments, typically, the control unit 2017 controls an overall operation of the first device 101. For example, the control unit 2017 may control the elements included in the first device 101 overall by executing a program stored in the first device 101. The control unit 2017 may include at least one of an arithmetic unit such as a CPU and a processor or may be included in another element. However, embodiments of the present invention are not limited thereto.

Referring to FIG. 21, the first device 101 may further include an integrity check data generation unit 2007, a storage unit 2009, a voice quality improvement information generation unit 2011, and a state information acquisition unit 2013.

According to some embodiments, the integrity check data generation unit 2007 may generate integrity check data of data to be transmitted. A method of generating the integrity check data corresponds to that described in FIG. 3. According to some embodiments, the integrity check data generation unit 2007 may be included in the control unit 2017, or the control unit 2017 may generate the integrity check data.

According to some embodiments, the integrity check data generation unit 2007 may determine at least one of the method of generating the integrity check data and the size of the integrity check data on the basis of the size of the packet determined by the communication unit 2001. This corresponds to that described in FIG. 6.

According to some embodiments, the storage unit 2009 may store the generated integrity check data. According to some embodiments, the storage unit 2009 may include a buffer, a RAM, a hard disk, etc., and their detailed description will be provided with reference to FIG. 17.

According to some embodiments, the voice quality improvement information generation unit 2011 may generate voice quality improvement data. The voice quality improvement data may include data for enhancing voice quality. According to some embodiments, the voice quality improvement information generation unit 2011 may generate the voice quality improvement information corresponding to the determined size of the packet.

In addition, according to some embodiments, the state information acquisition unit 2013 may acquire user state information. According to some embodiments, the user state information may include information acquired from a sensor of the first device or information analyzed on the basis of the information acquired from the sensor of the first device. As described above, the user state information may include user health state information.

As described in FIGS. 17 to 19, the state information acquisition unit 2013 may acquire or analyze the user health state information.

According to some embodiments, typically, the control unit 2017 controls an overall operation of the first device 101. This corresponds to that described in FIG. 15.

FIG. 22 is a detailed block diagram for describing a device configured to provide integrity check data according to some embodiments.

Referring to FIG. 22, the first device 101 may include a communication unit 2001, an encoder 2003, a packet generation unit 2005, an integrity check data generation unit 2007, a storage unit 2009, voice quality improvement information generation unit 2011, a state information acquisition unit 2013, and a control unit 2107 and may further include a user input unit 2200, an output unit 2210, and a signal acquisition unit 2015.

In addition, referring to FIG. 22, as a different embodiment from those shown in FIGS. 20 and 21, the encoder 2003 may include the voice quality improvement information generation unit 2011, and the communication unit 2001 may include the packet generation unit 2005.

According to some embodiments, the communication unit 2001 may establish a communication channel with at least one other device. This corresponds to that described above.

The communication unit 2001 may include one or more elements for communicating between the first device 101 and the at least one other device. A description of the communication unit 2001 corresponds to those described in FIGS. 15 and 16.

According to some embodiments, the communication unit 2001 may include the packet generation unit 2005, a short-range wireless communication unit 2231, a mobile communication unit 2232, and a broadcast receiving unit 2233. A description of the packet generation unit 2005 corresponds to those described in FIGS. 20 and 21.

The short-range wireless communication unit 2231 may include, but is not limited to, a Bluetooth communication unit, a Bluetooth Low Energy (BLE) communication unit, a near field communication unit, a wireless LAN (WLAN) communication unit, a Zigbee communication unit, an infrared data association (IrDA) communication unit, a Wi-Fi Direct (WFD) communication unit, an ultra wideband (UWB) communication unit, and an Ant+ communication unit.

The mobile communication unit 2232 transmits and receives a radio signal to and from at least one of a base station, an external terminal, and a server on a mobile communication network. The radio signal may include a voice call signal, a video call signal, or various forms of data according to transmission and/or reception of a text and/or multimedia message.

The broadcast receiving unit 2233 receives a broadcast signal and/or broadcast-related information from the outside over a broadcast channel. The broadcast channel may include a satellite channel and a terrestrial channel. Depending on the implementations, the first device 101 may not include the broadcast receiving unit 2233.

According to some embodiments, the storage unit 2009 may store a program for processing and controlling the control unit 2017 and may also store data that is input to the first device 101 and output from the first device 101.

According to some embodiments, the storage unit 2009 may include a flash memory type, hard disk type, multimedia card micro type, or card type memory (e.g., an SD or XD memory), or at least one type of storage medium of a random access memory (RAM), a static random access memory (SRAM), a read-only memory (ROM), an electrically erasable programmable read-only memory (EEPROM), a programmable read-only memory (PROM), a magnetic memory, a magnetic disk, and an optical disc.

According to some embodiments, programs stored in the storage unit 2009 may be classified into a plurality of modules according to the functions of the programs and, for example, may be classified into a UI module 2251, a touch screen module 2252, an alarm module 2253, and so on.

The UI module 2251 may provide a specialized UI, GUI, or the like, which cooperates with the first device 101 for each application. The touch screen module 2252 may sense a touch gesture of a user on a touch screen and deliver information regarding the touch gesture to the control unit 2017. The touch screen module 2252 according to some embodiments may recognize and analyze a touch code. The touch screen module 2252 may be configured as separate hardware including a controller.

In order to sense a touch or a proximity touch on the touch screen, various sensors may be provided inside or near the touch screen. An example of the sensor for sensing the touch on the touch screen is a tactile sensor. The tactile sensor denotes a sensor that senses a touch by a specific object to a degree that a human can feel or more. The tactile sensor may sense various information such as a roughness of a touched surface, a stiffness of a touched object, a temperature of a touched point, etc.

Moreover, an example of the sensor for sensing the touch on the touch screen is a proximity sensor 2228.

The proximity sensor 2228 denotes a sensor that uses an electromagnetic force or infrared light to detect an object approaching a detection surface or an object near the detection surface without any mechanical contact. Examples of the proximity sensor include a transmissive photoelectric sensor, a direct reflective photoelectric sensor, a mirror reflective photoelectric sensor, a high-frequency oscillation proximity sensor, a capacitive proximity sensor, a magnetic proximity sensor, and an infrared proximity sensor. Examples of a user's touch gesture may include a tap, a touch and hold, a double tap, a drag, panning, a flick, a drag and drop, a swipe, etc.

The alarm module 2253 may generate a signal for notifying of an occurrence of an event in the first device 101. Examples of the event occurring in the first device 101 may include reception of a call signal, reception of a message, input of a key signal, and notice of schedule. The alarm module 2253 may output an alarm signal in the form of a video signal through a display unit 2211, output an alarm signal in the form of an audio signal through a sound output unit 2212, and output an alarm signal in the form of a vibration signal through a vibration motor 2213. An operation performed by the storage unit 2009 corresponds to that described above, and thus its detailed description will be omitted.

Typically, the control unit 2017 controls an overall operation of the first device 101. This corresponds to that described above, and thus its detailed description will be omitted.

The user input unit 2200 denotes a unit for a user inputting data for controlling the first device 101. For example, the user input unit 2200 may include, but is not limited to, a key pad, a dome switch, a touch pad (a contact capacitance type, a pressure resistance type, an infrared sensing type, a surface ultrasonic wave conduction type, an integral tension measurement type, a piezoelectric effect type, etc.), a jog wheel, a jog switch, etc.

The output unit 2210 may output an audio signal, a video signal, and/or a vibration signal. The output unit 2210 may include the display unit 2211, the sound output unit 2212, and the vibration motor 2213.

The display unit 2211 displays and outputs information processed in the first device 101.

When the display unit 2211 and a touch pad form a layered structure and thus are implemented as a touch screen, the display unit 2211 may be used as an input device in addition to an output device. The display unit 2211 may include at least one of a liquid crystal display (LCD), a thin film transistor-LCD (TFT-LCD), an organic light emitting diode (OLED) display, a flexible display, a three-dimensional (3D) display, and an electrophoretic display. Depending on the implementations of the first device 101, the first device 101 may include two or more display units 2211. In this case, the two or more display units 2211 may be disposed to face each other using a hinge.

The sound output unit 2212 outputs audio data received from the communication unit 2001 or stored in the storage unit 2009. The sound output unit 2212 outputs an acoustic signal related to a function (e.g., a call signal reception sound, a message reception sound, or an alarm sound) performed by the first device 101. The sound output unit 2212 may include a speaker, a buzzer, etc.

The vibration motor 2213 may output a vibration signal. For example, the vibration motor 2213 may output a vibration signal corresponding to output of audio data or video data (e.g., a call signal reception sound, a message reception sound, etc.) In addition, the vibration motor 2213 may output the vibration signal when a touch is input to the touch screen.

Additionally, the first device 101 may further include a decoder (not shown). The decoder may decode the received voice data and may output the decoded voice data through the sound output unit 2212.

The state information acquisition unit (sensing unit) 2013 may sense a state of the first device 101 or a state surrounding the first device 101 and may deliver the sensed information to the control unit 2017.

The state information acquisition unit 2013 may include, but is not limited to, at least one of a magnetic sensor 2221, an acceleration sensor 2222, a temperature/humidity sensor 2223, an infrared sensor 2224, a gyroscope sensor 2225, a positioning sensor 2226 (e.g., a Global Positioning System (GPS) sensor), an air pressure sensor 2227, a proximity sensor 2228, and an RGB sensor (illumination sensor) 2229. A function for each sensor may be directly inferred from its name by those skilled in the art, and thus its detailed description will be omitted. As described above, the state information acquisition unit 2013 may acquire user state information on the basis of various sensors.

The signal acquisition unit (A/V input unit) 2015 is configured to input an audio signal or video signal and may include a camera 2241 and a microphone 2242. The camera 2241 may obtain a picture frame of a still image or moving image through an image sensor in a video call mode or image capturing mode. The image captured through the image sensor may be processed through the control unit 2017 or a separate image processing unit (not shown).

The picture frame processed by the camera 2241 may be stored in the storage unit 2009 or transmitted to the outside via the communication unit 2001. Two or more cameras 2241 may be provided according to a configuration aspect of the terminal.

The microphone 2242 receives and processes an external acoustic signal into electrical voice data. For example, the microphone 2242 may receive an acoustic signal from the first device 101 or a speaker. The microphone 2242 may use various algorithms for adjusting noise generated while receiving the external acoustic signal.

The encoder 2003 may also determine whether the user's voice is included in the signal acquired through the microphone 2242. An operation of the encoder 2003 corresponds to that described above, and thus its detailed description will be omitted. In addition, the voice quality improvement information generation unit 2011 and the integrity check data generation unit 2007 correspond to those described above, and thus their detailed description will be omitted.

The device described herein may comprise a processor, a memory for storing program data and executing it, a permanent storage unit such as a disk drive, a communication port for handling communications with external devices, and user interface devices, including a touch panel, keys, buttons, etc. When software modules or algorithms are involved, these software modules may be stored as program instructions or computer-readable codes executable on a processor on a computer-readable recording medium. Examples of the computer-readable recording medium include magnetic storage media (e.g., ROM, RAM, floppy disks, hard disks, etc.), and optical recording media (e.g., CD-ROMs, digital versatile disks (DVDs), etc.). The computer-readable recording medium can also be distributed over network coupled computer systems so that the computer-readable code is stored and executed in a distributive manner. This media can be read by the computer, stored in the memory, and executed by the processor.

All references, including publications, patent applications, and patents, cited herein are hereby incorporated by reference to the same extent as if each reference were individually and specifically indicated to be incorporated by reference and were set forth in its entirety herein.

For the purposes of promoting understanding of the principles of embodiments, reference has been made to the exemplary embodiments illustrated in the drawings, and specific language has been used to describe these embodiments. However, no limitation of the scope of embodiments is intended by this specific language, and embodiments should be construed to encompass all embodiments that would normally occur to one of ordinary skill in the art.

Embodiments may be described in terms of functional block components and various processing steps. Such functional blocks may be realized by any number of hardware and/or software components configured to perform the specified functions. For example, embodiments may employ various integrated circuit (IC) components, e.g., memory elements, processing elements, logic elements, look-up tables, and the like, which may carry out a variety of functions under the control of one or more microprocessors or other control devices. Similarly, where the elements of embodiments are implemented using software programming or software elements, embodiments may be implemented with any programming or scripting language such as C, C++, Java, assembler language, or the like, with the various algorithms being implemented with any combination of data structures, objects, processes, routines or other programming elements. Functional aspects may be implemented in algorithms that are executed on one or more processors. Furthermore, embodiments could employ any number of conventional techniques for electronics configuration, signal processing and/or control, data processing and the like. The words "mechanism," "element," "means," and "configuration" are used broadly and are not limited to mechanical or physical embodiments, but can include software routines in conjunction with processors, etc.

The particular implementations shown and described herein are illustrative examples of embodiments and are not intended to otherwise limit the scope of embodiments in any way. For the sake of brevity, conventional electronics, control systems, software development and other functional aspects of the systems may not be described in detail. Furthermore, the connecting lines, or connectors shown in the various figures presented are intended to represent exemplary functional relationships and/or physical or logical couplings between the various elements. It should be noted that many alternative or additional functional relationships, physical connections or logical connections may be present in a practical device. Moreover, no item or component is essential to the practice of embodiments unless the element is specifically described as "essential" or "critical."

The use of the terms "a" and "an" and "the" and similar referents in the context of describing embodiments (especially in the context of the following claims) are to be construed to cover both the singular and the plural. Furthermore, recitation of ranges of values herein are merely intended to serve as a shorthand method of referring individually to each separate value falling within the range, unless otherwise indicated herein, and each separate value is incorporated into the specification as if it were individually recited herein. Also, the steps of all methods described herein can be performed in any suitable order unless otherwise indicated herein or otherwise clearly contradicted by context. Embodiments are not limited to the described order of the steps. The use of any and all examples, or exemplary language (e.g., "such as") provided herein, is intended merely to better illuminate embodiments and does not pose a limitation on the scope of embodiments unless otherwise claimed. Numerous modifications and adaptations will be readily apparent to one of ordinary skill in the art without departing from the spirit and scope of the inventive concept.

The invention claimed is:

1. A method for transmitting integrity check data by a device, the method comprising:
    establishing, by the device, a voice communication channel with at least one other device;
    determining whether a voice of a user is detected from an input signal to the device;
    based on determining that the user voice is detected, inserting encoded user voice data, but no integrity check data, into first packets for transmitting to the at least one other device over the voice communication channel;
    based on determining that the user voice is not detected, selectively inserting integrity check data into second packets for transmitting to the at least one other device over the voice communication channel; and
    transmitting packets including the first and second packets to the at least one other device,
    wherein the integrity check data included in at least one of the second packets includes integrity check data usable by the at least one other device in checking integrity of data in a packet transmitted over the voice communication channel prior to the at least one of the second packets.

2. The method of claim 1, further comprising:
    determining whether to encode the input signal based on a result of determining whether the user voice is detected,
    wherein the selective inserting of the integrity check data into the second packets is based on the determining of whether to encode the input signal.

3. The method of claim 1, further comprising:
    generating integrity check data for data to be transmitted in the prior packet;
    storing the generated integrity check data;
    transmitting the prior packet;
    identifying, as the one of the second packets, a packet to be transmitted subsequent to the prior packet; and
    inserting the stored integrity check data into the one of the second packets.

4. The method of claim 3, further comprising:
    determining a packet size for the transmitted packets based on a bandwidth of the voice communication channel,
    wherein the generating of the integrity check data comprises:
        determining at least one of a method of generating the integrity check data or a size of the integrity check data included in the second packets based on the determined size of the transmitted packets; and
        generating the integrity check data based on the determined at least one of a method of generating the integrity check data or a size of the integrity check data.

5. The method of claim 1, further comprising inserting noise data into the second packets in addition to the integrity check data.

6. The method of claim 1, further comprising selectively inserting voice quality improvement data into one or more of the second packets.

7. The method of claim 1, further comprising:
    acquiring state information of a user of the device; and
    selectively inserting the user state information into one or more of the second packets.

8. The method of claim 3, wherein the the integrity check data is generated for only a portion of the data to be transmitted.

9. A device for transmitting integrity check data, the device comprising:
    communication circuitry configured to establish a voice communication channel with at least one other device;
    an encoder; and
    a processor configured to:
        determine whether a voice of a user is detected from an input signal to the device;
        based on determining that the user voice is detected, control inserting user voice data encoded by the encoder, but no integrity check data, into first packets for transmitting to the at least one other device over the voice communication channel;
        based on determining that the user voice is not detected, control selectively inserting integrity check data into second packets for transmitting to the at least one other device over the voice communication channel; and
        control transmitting, via the communication circuitry, packets, including the first and second packets, to the at least one other device,
    wherein the integrity check data included in at least one of the second packets includes integrity check data usable by the at least one other device in checking integrity of data in a packet transmitted over the voice communication channel prior to the at least one of the second packets.

10. The device of claim 9, further comprising:
    storage,
    wherein the processor is further configured to:
        generate integrity check data for data to be transmitted in the prior packet;
        control storing the generated integrity check data in the storage;
        identifying, as the one of the second packets, a packet to be transmitted subsequent to the prior packet; and
        control inserting the stored integrity check data into the one of the second packets.

11. The device of claim 10, wherein the processor is further configured to:
    determine a packet size for the transmitted packets based on a bandwidth of the voice communication channel;
    determine at least one of a method of generating the integrity check data or a size of the integrity check data included in the second packets based on the determined size of the transmitted packets; and
    generate the integrity check data based on the determined at least one of a method of generating the integrity check data or a size of the integrity check data.

12. The device of claim 9, wherein the processor is further configured to control selectively inserting voice quality improvement data into one or more of the second packets.

13. A non-transitory computer-readable recording medium storing a computer program which, when executed by a processor of a device, causes the processor to control the device to perform operations comprising:
    establishing a voice communication channel with at least one other device;

determining whether a voice of a user is detected from an input signal to the device;

based on determining that the user voice is detected, inserting encoded user voice data, but no integrity check data, into first packets for transmitting to the at least one other device over the voice communication channel;

based on determining that the user voice is not detected, selectively inserting integrity check data into second packets for transmitting to the at least one other device over the voice communication channel; and transmitting packets including the first and second packets to the at least one other device, wherein the integrity check data included in at least one of the second packets includes integrity check data usable by the at least one other device in checking integrity of data in a packet transmitted over the voice communication channel prior to the at least one of the second packets.

14. The non-transitory computer-readable recording medium of claim 13, wherein the operations further comprise:

generating integrity check data for data to be transmitted in the prior packet;

storing the generated integrity check data;

transmitting the prior packet;

identifying, as the one of the second packets, a packet to be transmitted subsequent to the prior packet; and inserting the stored integrity check data into the one of the second packets.

* * * * *